United States Patent
Shimomura et al.

[11] Patent Number: 5,808,795
[45] Date of Patent: Sep. 15, 1998

[54] PROJECTION TYPE DISPLAY APPARATUS

[75] Inventors: Hideaki Shimomura; Kiyoshi Numazaki, both of Kanagawa-ken; Yoshiro Oikawa, Tokyo; Naotaka Shimamura; Motoi Ueda, both of Kanagawa-ken; Takeshi Hasegawa, Tokyo, all of Japan

[73] Assignee: Nikon Corporation, Tokyo, Japan

[21] Appl. No.: 611,555

[22] Filed: Mar. 6, 1996

[30] Foreign Application Priority Data

Mar. 6, 1995 [JP] Japan .................................. 7-072372
Jun. 9, 1995 [JP] Japan .................................. 7-168298

[51] Int. Cl.$^6$ .............................. G02B 5/30; G03B 21/14
[52] U.S. Cl. .................... 359/488; 359/496; 359/499; 359/500; 349/5; 349/9; 353/20; 362/19
[58] Field of Search .................... 359/495, 496, 359/498, 500, 487, 488; 353/20; 349/9, 5; 362/19

[56] References Cited

U.S. PATENT DOCUMENTS

| | | | |
|---|---|---|---|
| 4,191,456 | 3/1980 | Hong et al. ........................ | 353/31 |
| 4,687,301 | 8/1987 | Ledebuhr ........................... | 359/634 |
| 5,453,859 | 9/1995 | Sannohe et al. .................... | 349/9 |
| 5,459,592 | 10/1995 | Shibatani et al. ................. | 349/5 |
| 5,576,854 | 11/1996 | Schmidt et al. .................... | 349/5 |

FOREIGN PATENT DOCUMENTS

| | | | | |
|---|---|---|---|---|
| 61-84606 | 4/1986 | Japan | .............. | G02B 5/30 |
| 61-141402 | 6/1986 | Japan | .............. | G02B 5/30 |
| 62-012634 | 1/1987 | Japan | .............. | C03C 3/07 |
| 62-12634 | 1/1987 | Japan | .............. | C03C 3/07 |
| 3-284705 | 12/1991 | Japan | .............. | G02B 5/30 |
| 7-215732 | 8/1995 | Japan | .............. | G02B 5/30 |
| 7-218723 | 8/1995 | Japan | .............. | G02B 5/30 |
| 7-294732 | 11/1995 | Japan | .............. | G02B 5/30 |
| 8-21982 | 1/1996 | Japan | .............. | G02B 5/30 |
| 8-5836 | 1/1996 | Japan | .............. | G02B 5/30 |
| WO95/21137 | 8/1995 | WIPO | .............. | G02B 5/28 |

OTHER PUBLICATIONS

Aben et al., "Photoelasticity of Glass", (1994) pp. 103–105 Springer–Verlag, New York.

*Primary Examiner*—Paul M. Dzierzynski
*Assistant Examiner*—John Juba, Jr.
*Attorney, Agent, or Firm*—Foley & Lardner

[57] ABSTRACT

A projection type display apparatus includes a spatial light modulator, a polarizing beam splitter formed of members of a transparent material, and a projection optical system. The polarizing beam splitter includes a dielectric multilayer film, and a first transparent material member and a second transparent material member sandwiching the dielectric multilayer film. Each of the first and second transparent material members is made of a transparent material with a refractive index of at least 1.8 and with an absolute value of the photoelastic constant being no more than $1.5 \times 10^{-8}$ cm$^2$/N for light of wavelengths 0.4 μm to 0.7 μm, incident to the polarizing beam splitter.

12 Claims, 30 Drawing Sheets

(2 of 30 Drawing(s) Filed in Color)

Fig. 5

| SAMPLE No.<br>GLASS COMPOSITION (wt %) | 1 | 2 | 3 | 4 | 5 | 6 | 7 | BK7 |
|---|---|---|---|---|---|---|---|---|
| $SiO_2$ | 25.9 | 25.4 | 24.9 | 24.4 | 23.9 | 23.4 | 22.9 | 68.9 |
| $B_2O_3$ | — | — | — | — | — | — | — | 10.1 |
| $Na_2O$ | 0.9 | 0.9 | 0.9 | 0.9 | 0.9 | 0.9 | 0.9 | 8.8 |
| $K_2O$ | 0.9 | 0.9 | 0.9 | 0.9 | 0.9 | 0.9 | 0.9 | 8.4 |
| $BaO$ | — | — | — | — | — | — | — | 2.8 |
| $PbO$ | 72.0 | 72.5 | 73.0 | 73.5 | 74.0 | 74.5 | 75.0 | — |
| $As_2O_3$ | — | — | — | — | — | — | — | 1.0 |
| $Sb_2O_3$ | 0.3 | 0.3 | 0.3 | 0.3 | 0.3 | 0.3 | 0.3 | — |
| PHOTOELASTIC CONSTANT ($10^{-8} cm^2/N$) | 0.41 | 0.30 | 0.22 | 0.10 | 0.01 | -0.07 | -0.12 | 2.78 |

Fig. 15

| GLASS SUBSTRATE | PHOTOELASTIC CONSTANT C ($10^{-8}$ cm²/N) | STRAIN (nm/cm) | EVALUATION RESULTS OF PBS (PHOTO) | EVALUATION RESULTS OF DISPLAY WITH PBS |
|---|---|---|---|---|
| PBM35 FROM OHARA | 2.0 | 13 | × | × |
| PBH11 FROM OHARA | 1.33 | 7 | △ | ○ |
| PBS USED IN EMBODIMENT | <0.1 | — | ○ | ◎ |

STRAIN: OPTICAL PATH DIFFERENCE ΔR(nm) PER UNIT TRANSMISSION THICKNESS (cm) OF GLASS SUBSTRATE

PROJECTION TYPE DISPLAY APPARATUS

BACKGROUND OF THE INVENTION

1. Field of the Invention

The present invention relates to a projection type display apparatus utilizing a spatial light modulator, and more particularly, to a projection type display apparatus having the structure for securing optically stable performance against influence of external stress and effectively restricting image quality degradation of projection image.

2. Related Background Art

A known example of the spatial light modulator conventionally used for projection type display apparatus is a spatial light modulator of a phase difference modulation type (polarization modulation type), which outputs spatially modulating light, utilizing polarization. For example, a modulator formed using the liquid crystal (phase difference modulation type liquid crystal light valve) is practically available as the spatial light modulator of the phase difference modulation type.

The conventional projection type display apparatus using such a spatial light modulator of the phase difference modulation type uses a polarizing beam splitter (primary polarizing beam splitter) serving as a polarizer and an analyzer. For the below description, let us assume that the polarizing beam splitter has such a property as to reflect an s-polarized light component and transmit a p-polarized light component. In the conventional projection type display apparatus, the polarizing beam splitter splits light incident thereinto (light directly incident from an illumination light source or light after color-separated before incidence thereto) into light of the p-polarized light component and light of s-polarized light component, and, normally, the s-polarized light component out of the light thus split into is projected to the spatial light modulator. After modulated and reflected by a liquid crystal layer of the spatial light modulator, the light again goes back into the polarizing beam splitter. On this occasion, the reflected light from the spatial light modulator is analyzed by the polarizing beam splitter. The above polarizing beam splitter reflects the s-polarized light component, but transmits only the p-polarized light resulting from the modulation by the spatial light modulator. The transmitted light (that is, the analyzed light) is projected as a projection image through a projection optical system onto a screen or the like.

Many polarizing beam splitters used in such projection type display apparatus have been proposed as liquid immersion type polarizing beam splitters in such structure that a plate of an optically transparent material coated with a coating for polarizing beam splitter was immersed in a liquid with adjusted refractive index, as disclosed for example in U.S. Pat. No. 4,687,301 assigned to Hughes Aircraft Co. The refractive index of the above liquid, at a predetermined temperature of the liquid, is adjusted so as to be equal to that of the plate of the transparent material. The reason why the beam splitter is immersed in the liquid is that, supposing the beam splitter were set in air, the interface of the coating would be in a relation of air against transparent material and the polarizing beam splitter would fail to function because of a difference in refractive index.

Here, FIG. 1 shows a diagrammatic drawing to show the major part of an example of the conventional projection type display apparatus employing the polarizing beam splitter 1 of the liquid immersion type as described above. This polarizing beam splitter 1 is formed in such an arrangement that the plate 3 of the transparent material coated with the coating for polarizing beam splitter is immersed in the liquid 2 with adjusted refractive index. Further, the spatial light modulator 4 of the phase difference modulation type is disposed near the polarizing beam splitter 1. The light 1a incident into the polarizing beam splitter 1 is split by the polarizing beam splitter 1 into the light of the p-polarized light component and s-polarized light component, among which the s-polarized light component is projected to the spatial light modulator 4. After modulated and reflected by the liquid crystal layer or the like of the spatial light modulator 4, the light returns to the polarizing beam splitter 1. On this occasion, the reflected light from the spatial modulator 4 is analyzed by the polarizing beam splitter 1. The light 1b thus analyzed is projected as a projection image through the projection optical system onto the screen or the like.

SUMMARY OF THE INVENTION

The inventors found out the following problems after investigation of the conventional projection type display apparatus employing the polarizing beam splitter of the liquid immersion type as discussed above.

First, in the case of the above liquid immersion type polarizing beam splitter, a change of the refractive index of the liquid in which the plate of the transparent material is immersed depends upon a change of the temperature of the liquid. Namely, even with the liquid adjusted in its refractive index at a certain liquid temperature, the temperature change of the liquid itself will make a difference between the refractive index of the liquid and the refractive index of the plate of the transparent material. This changes the performance of the entire polarizing beam splitter. For example, in the case of a certain sample (the liquid for the above liquid immersion type polarizing beam splitter), the refractive index changes about 0.000349 per temperature rise of 1° C., and this change rate is two orders of magnitude greater than those of substrate materials for plates of normal transparent materials. Normally, use environments (for example, temperatures) of the projection type display apparatus include a possibility of change of about 20° C. to 60° C., so that the difference in refractive index becomes unignorable. Since dispersion also changes, it causes chromatic aberration and chromatic unevenness in the projection image.

Second, in the case of the above liquid immersion type polarizing beam splitter, if the temperature change in the liquid is not even, the temperature dependence of the refractive index of the liquid as discussed above will affect the evenness of the refractive index of the liquid, thereby forming an index distribution in the liquid. In a practical projection type display apparatus, the liquid temperature rarely changes evenly over the entire liquid (whereby the refractive index of the entire liquid is not even), which will be a great cause to damage the evenness of the projection image.

Third, in the case of the liquid immersion type polarizing beam splitter, the above uneven temperature change of the liquid destroys the evenness of the density of the liquid as well as that of the refractive index of the liquid as discussed above, resulting in causing convection in the liquid. Since this convection causes a time change of the uneven index distribution in the liquid as described above, the occurrence of convection will be a cause to change the unevenness of picture quality with time in the projection type display apparatus.

Fourth, in the above liquid immersion type polarizing beam splitter, the volume of the liquid itself also changes with a change of the liquid temperature. In the case of the above sample, the temperature change of 1° C. changes the volume at 0.00073 cc per cc. The use environments (for example, the temperatures) of the projection type display apparatus cover a temperature difference of about 40° C., but, considering transportation and storage in warehouse, it is necessary to take account of the temperature range of approximately −10° C. to 80° C. Although the volume change itself of the liquid gives a small effect on the projection image, some mechanism is needed for absorbing the volume change of the liquid because of the configuration of the apparatus.

Fifth, if there is dust in the liquid of the above liquid immersion type polarizing beam splitter, the projection type display apparatus employing the liquid immersion type polarizing beam splitter will indicate the dust in the liquid in the projection image enlarged some ten to some hundred times, even if the dust in the liquid is not located near the focal point. Considering this situation, there should exist no dust in the liquid. Accordingly, assembling of the above liquid immersion type polarizing beam splitter requires a clean room and a work for removing dust and foreign matter in the liquid therefrom.

Sixth, if a bubble exists in the liquid in the above liquid immersion type polarizing beam splitter, the bubble will appear in the projection image, and thus, it should be preliminarily removed.

Seventh, because the above liquid immersion type polarizing beam splitter uses the liquid because of its structure, it is necessary to provide a case for housing the liquid with a means for preventing leakage of the liquid, such as an O-ring.

As discussed above, the liquid immersion type polarizing beam splitter has a lot of problems because of its structural feature or the like, and the projection type display apparatus employing it naturally requires a lot of time and labor for production thereof, which results in increasing the cost. Particularly, the characteristic changes of the refractive index etc. due to the liquid temperature change of the liquid are substantially unavoidable problems. Since the liquid immersion type polarizing beam splitter cannot be set at the setting angle of 45° relative to the optical axis because of the refractive index, the projection type display apparatus employing the polarizing beam splitter becomes large and heavy.

Moreover, in the case of the conventional polarizing beam splitter constructed of a block of the transparent material, optical anisotropy of glass caused by various factors induces double refraction, which could disturb the polarizing characteristics of the polarizing beam splitter, possibly resulting in failing to fully reduce the image quality degradation of the projection image. Here, the various factors mainly include processing steps of the transparent material (cutting, bonding with another material, and film formation on surface), external stress caused in the operation of incorporating the transparent material into the optical system (holding with a jig, adhesion, etc.), thermal stress caused by heat generation inside the transparent material (absorption of light energy etc.) or external heat generation (heat generation of peripheral devices etc.), and stress caused when the transparent material is bonded in contact with another material of a different thermal expansion coefficient during heat generation. As described, these various thermal stress and external stress occurs throughout the period ranging from fabrication of the transparent material block and processing of the polarizing beam splitter to the operating duration of the projection type display apparatus, and it is thus very difficult to eliminate all of those factors.

The present invention has been accomplished to solve the above problems, and an object of the invention is to provide a projection type display apparatus which employs a polarizing beam splitter constructed of a transparent material block (solid material), thereby removing the various problems resulting from employment of the above-discussed liquid immersion type polarizing beam splitter, being capable of securing optically stable performance against the influence of various thermal stress and external stress in the transparent material block, and decreasing the degradation of image quality.

The present invention was realized by the inventors' finding that the image quality degradation of the image projected onto a predetermined surface by the projection type display apparatus was able to be effectively controlled by changing the photoelastic constant of the transparent material block (solid material) for the polarizing beam splitter or for a member desired to preserve the polarizing characteristics with high accuracy, used in the projection type display apparatus.

Thus, the projection type display apparatus according to the present invention is an apparatus comprising a polarizing beam splitter formed of the above transparent material members, which has a structure for securing optically stable performance against the influence of various thermal stress and external stress in the mentioned members so as to decrease the image quality degradation of a projection image, and which comprises a spatial light modulator, the above polarizing beam splitter, and a projection optical system. In particular, the above polarizing beam splitter is comprised of a dielectric multilayer film, and a first transparent material member and a second transparent material member sandwiching the dielectric multilayer film, wherein each of the first and second transparent material members is made of an optically transparent material having the refractive index of at least 1.8 and an absolute value of the photoelastic constant of no more than $1.5 \times 10^{-8}$ cm$^2$/N for light of the wavelengths 0.4 µm to 0.7 µm incident to the polarizing beam splitter.

The apparatus uses the polarizing beam splitter formed using the first and second transparent material members (optical glass substrates in a block shape) each made of the transparent material with the absolute value of the photoelastic constant being no more than $1.5 \times 10^{-8}$ cm$^2$/N for the wavelengths ($\lambda$=0.4 µm to 0.7 µm) of the incident light into the polarizing beam splitter, but does not use the conventional liquid immersion type polarizing beam splitter. Accordingly, the present invention is free from the various problems due to employment of the conventional liquid immersion type polarizing beam splitter, such as convection, dust, and bubbles, as found by the inventors, and has advantages including the advantage of facilitating production of the projection type display apparatus. Since the refractive indices of the first and second transparent material members (optical glass substrates) constituting the above polarizing beam splitter are at least 1.8, the polarizing beam splitter obtained is one that can be set at the angle of 45° relative to the optical axis. This can realize compactification of the entire projection type display apparatus.

On the other hand, the above dielectric multilayer film comprises at least a first dielectric multilayer film and a second dielectric multilayer film. Each of these first and second dielectric multilayer films has an alternate layer which is a lamination of n cycles (where n is an arbitrary integer), defining a basic cycle comprised of two layers made of a high-index substance of an optical thickness $\lambda_1/4$ and a low-index substance of an optical thickness $\lambda_2/4$ at two different center wavelengths $\lambda_1$, $\lambda_2$ corresponding thereto; and thin-film adjuster layers formed on either side of the alternate layer and made of either the high-index substance of an optical thickness $\lambda_1/8$ or the low-index substance of an optical thickness $\lambda_2/8$. Further, the alternate layer of the first dielectric multilayer film and the alternate layer of the second dielectric multilayer film are formed of respective combinations of mutually different types of substances.

Specifically, the alternate layer of the above first dielectric multilayer film employs a combination of the high-index substance $TiO_2$ with the low-index substance $SiO_2$; whereas the alternate layer of the above second dielectric multilayer film employs a combination of the high-index substance $TiO_2$ with the low-index substance $Al_2O_3$.

Alternatively, the alternate layer of the above first dielectric multilayer film may employ the combination of the high-index substance $TiO_2$ with the low-index substance $SiO_2$; whereas the alternate layer of the above second dielectric multilayer film may employ a combination of the high-index substance $ZrO_2$ with the low-index substance $MgF_2$.

Incidentally, a single polarizing beam splitter normally has the extinction ratio (a ratio of the intensity of the p-polarized light component transmitted to the intensity of the s-polarized light component transmitted) being, for example, about 10:1. The projection type display apparatus having a single polarizing beam splitter cannot take a large contrast of projection image accordingly. Then, the contrast is improved by the following two methods. The first method is a method for placing an auxiliary polarizing beam splitter (pre-polarizing beam splitter) before the primary polarizing beam splitter (that is, on the incidence side of the incident light with respect to the principal polarizing beam splitter) in order to raise the purity of polarization of the light irradiating the spatial light modulator (i.e., the reading light). This arrangement improves the extinction ratio of the reading light to about 100:1, thus improving the contrast of the projection image obtained. The second method is a method for placing an auxiliary polarizing beam splitter (post-polarizing beam splitter) on the side of projection optical system with respect to the principal polarizing beam splitter in order to raise the purity of polarization of the light modulated and reflected by the spatial light modulator and thereafter transmitted by the polarizing beam splitter (that is, the light analyzed by the principal polarizing beam splitter and thereafter projected through the projection optical system onto the screen). This arrangement can also improve the contrast of the projection image obtained.

As apparent from the above explanation, the polarizing beam splitter plays a great role in the image quality of projection image in the case of the projection type display apparatus using the spatial light modulator of the phase difference modulation type.

Accordingly, the projection type display apparatus according to the present invention may further comprise a first auxiliary polarizing beam splitter (the pre-polarizing beam splitter as described above) for raising the purity of polarization of the light projected to the spatial light modulator, which is disposed on the incidence side of the above polarizing beam splitter (i.e., on the side of the light incidence surface of the above polarizing beam splitter to which the light before reflected by the spatial light modulator is incident). This first auxiliary polarizing beam splitter has the same configuration as the polarizing beam splitter as described above, and is comprised of a dielectric multilayer film, and third and fourth transparent material members sandwiching the dielectric multilayer film. In this case, the first auxiliary polarizing beam splitter is also preferably formed using optical glass substrates (first and second transparent material members) each made of an optically transparent solid material with the absolute value of the photoelastic constant being no more than $1.5\times10^{-8}$ $cm^2/N$ for the wavelengths ($\lambda=0.4$ $\mu m$ to $0.7$ $\mu m$) of the incident light into the first auxiliary polarizing beam splitter. It is noted that the above first auxiliary polarizing beam splitter does not always have to be constructed of the substrates made of the transparent solid material with the absolute value of the photoelastic constant being no more than $1.5\times10^{-8}$ $cm^2/N$.

The projection type display apparatus according to the present invention may further comprise a second auxiliary polarizing beam splitter (the post-polarizing beam splitter as described above) for raising the purity of polarization of the light analyzed by the polarizing beam splitter and thereafter projected by the projection optical system, which is located on the side of projection optical system with respect to the above polarizing beam splitter. This second auxiliary polarizing beam splitter also has the same configuration as the above polarizing beam splitter and pre-polarizing beam splitter, and is comprised of a dielectric multilayer film, and fifth and sixth transparent material members sandwiching the dielectric multilayer film. In this case, the second auxiliary polarizing beam splitter is also preferably formed using substrates each made of an optically transparent solid material with the absolute value of the photoelastic constant being no more than $1.5\times10^{-8}$ $cm^2/N$ for the predetermined wavelengths of the incident light into the second auxiliary polarizing beam splitter. It is also noted that the above second auxiliary polarizing beam splitter does not always have to be constructed of the substrates made of the optically transparent solid material with the absolute value of the photoelastic constant being no more than $1.5\times10^{-8}$ $cm^2/N$.

In a preferred embodiment, all the above polarizing beam splitter, first auxiliary polarizing beam splitter, and second auxiliary polarizing beam splitter are formed of the substrates each made of the optically transparent solid material with the absolute value of the photoelastic constant being no more than $0.5\times10^{-8}$ $cm^2/N$ for the wavelengths ($\lambda=0.4$ $\mu m$ to $0.7$ $\mu m$) of the incident light into the beam splitter. Further, the beam splitters are more preferably constructed of the optical glass substrates (first and second transparent material members) each made of an optically transparent solid material with the absolute value of the photoelastic constant being in the substantially zero range (for example, no more than $0.1\times10^{-8}$ $cm^2/N$) for the wavelengths of the incident light into the beam splitter.

Generally, when a force is applied to an isotropically uniform and transparent solid material to exert stress thereon, optical anisotropy appears in the transparent solid material, so that the transparent solid material comes to have double refraction. This phenomenon is called as photoelastic effect. The double refraction is a phenomenon that a plurality of refracted light beams appear when light is incident into an anisotropic medium. Refractive indices of transparent solid material with stress can be expressed by a so-called index ellipsoid, and in this case, the principal index axes of the index ellipsoid correspond to the principal stresses. Generally, defining the principal indices as $n_1$, $n_2$, $N_3$, and the principal stresses as $\sigma_1$, $\sigma_2$, $\sigma_3$, (where those with a same subscript are present in a same direction), the following relations hold between these.

$$n_1 = n_0 + C_1\sigma_1 + C_2(\sigma_2 + \sigma_3) \quad (1)$$

$$n_2 = n_0 + C_1\sigma_2 + C_2(\sigma_3 + \sigma_1) \quad (2)$$

$$n_3 = n_0 + C_1\sigma_3 + C_2(\sigma_1 + \sigma_2) \quad (3)$$

Here, $C_1$ and $C_2$ are constants intrinsic to the wavelength of light and the substance of the transparent solid material.

When the light is incident to the transparent solid material, taking such coordinates that the direction of incidence is aligned with the direction of $\sigma_3$, the incident light is separated into two linearly polarized light components oscillating in the directions of $\sigma_1$ and $\sigma_2$, that is, having mutually orthogonal planes of oscillation. Since the refractive indices in the respective principal stress directions ($n_1$, $n_2$) are different from each other, these two linearly polarized light components, when emerging from the transparent material, will have an optical path difference (phase difference) $\Delta R$ as expressed by the following equation.

$$\begin{aligned}\Delta R &= (2\pi/\lambda)(n_2 - n_1) \cdot L \quad (4) \\ &= (2\pi/\lambda)(C_1 - C_2)(\sigma_2 - \sigma_1) \cdot L \\ &= (2\pi/\lambda) \cdot C \cdot (\sigma_2 - \sigma_1) \cdot L\end{aligned}$$

In the equation, $\lambda$ is the wavelength of light and L is a light transmission thickness of the transparent solid material. Further, $C=(C_1-C_2)$ is called as a photoelastic constant, which is a coefficient indicating the magnitude of double refraction caused by stress (a double refraction amount per unit stress).

The conventional polarizing beam splitters constructed of the transparent material blocks (optical glass substrates) were made of cheap glasses with durability, for example such as BK7 (a trade name of borosilicate glass available from Schott Co., Germany). However, the photoelastic constant is not considered at all in selecting these glasses, and values thereof are relatively large (for example, the photoelastic constant of BK7 is $2.78 \times 10^{-8}$ cm$^2$/N at the wavelength $\lambda=633$ nm), which makes unignorable the optical anisotropy induced by the thermal stress or mechanical external stress, and the optical path difference $\Delta R$ based thereon. In other words, the image quality degradation of projection image becomes outstanding when the polarizing beam splitters using such glasses are employed for the projection type display apparatus.

In contrast with it, because the present invention employs the polarizing beam splitter of the optical glass substrates each made of the transparent solid material with the absolute value of the photoelastic constant being no more than $1.5 \times 10^{-8}$ cm$^2$/N for the wavelengths ($\lambda=0.4$ $\mu$m to $0.7$ $\mu$m) of the incident light into the polarizing beam splitter, the apparatus can secure optically stable performance against the influence of various thermal stress and external stress and can fully reduce the degradation of image quality.

It is preferred to employ either one or the both of the pre-polarizing beam splitter and the post-polarizing beam splitter, because the extinction ratio increases whereby the contrast of the image obtained is improved. In this case, it is preferred to use the pre-polarizing beam splitter or the post-polarizing beam splitter of the polarizing beam splitter formed using the optical glass substrates each made of the transparent material with the absolute value of the photoelastic constant being no more than $1.5 \times 10^{-8}$ cm$^2$/N for the wavelengths ($\lambda=0.4$ $\mu$m to $0.7$ $\mu$m) of the incident light into the beam splitter, because the optically stable performance can be fully secured against an increase of stress caused by a temperature change, as compared with the conventional apparatus, and the degradation of image quality can be further decreased. It is, however, noted that the pre-polarizing beam splitter or the post-polarizing beam splitter helps only either one of the functions as a polarizer and an analyzer. Therefore, because they are less influential in the image quality of projection image than the principal polarizing beam splitter used as the both of polarizer and analyzer, a polarizing beam splitter formed using the substance material of BK7 or the like may be employed as the pre-polarizing beam splitter or the post-polarizing beam splitter.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 5 is a drawing to show a table of compositions and photoelastic constants for samples prepared as optical glass members of the polarizing beam splitter;

FIG. 15 is a drawing to show a table of samples evaluated by the apparatus shown in FIG. 14;

DETAILED DESCRIPTION OF THE PREFERRED EMBODIMENTS

Figure 1:
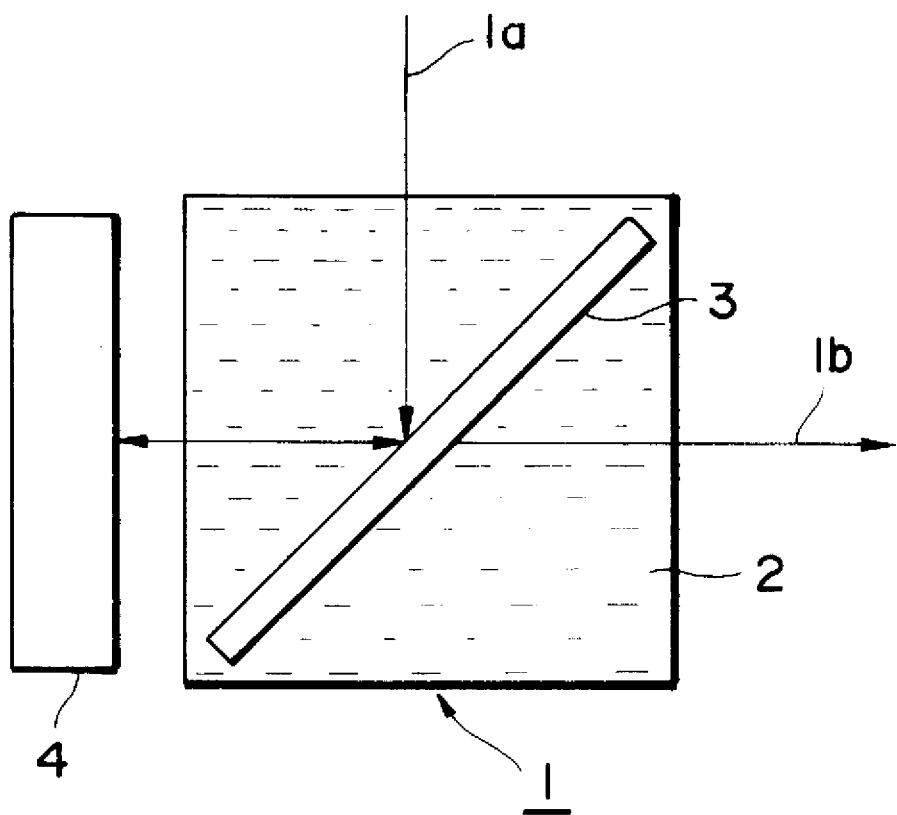
FIG. 1 is a schematic drawing to show the configuration of the conventional display apparatus employing the liquid immersion type polarizing beam splitter.

The projection type display apparatus according to the various embodiments of the present invention will be explained with reference to FIGS. 2 to 34. Same portions will be denoted by same reference numerals and redundant description will be omitted.

Embodiment 1

Figure 2:
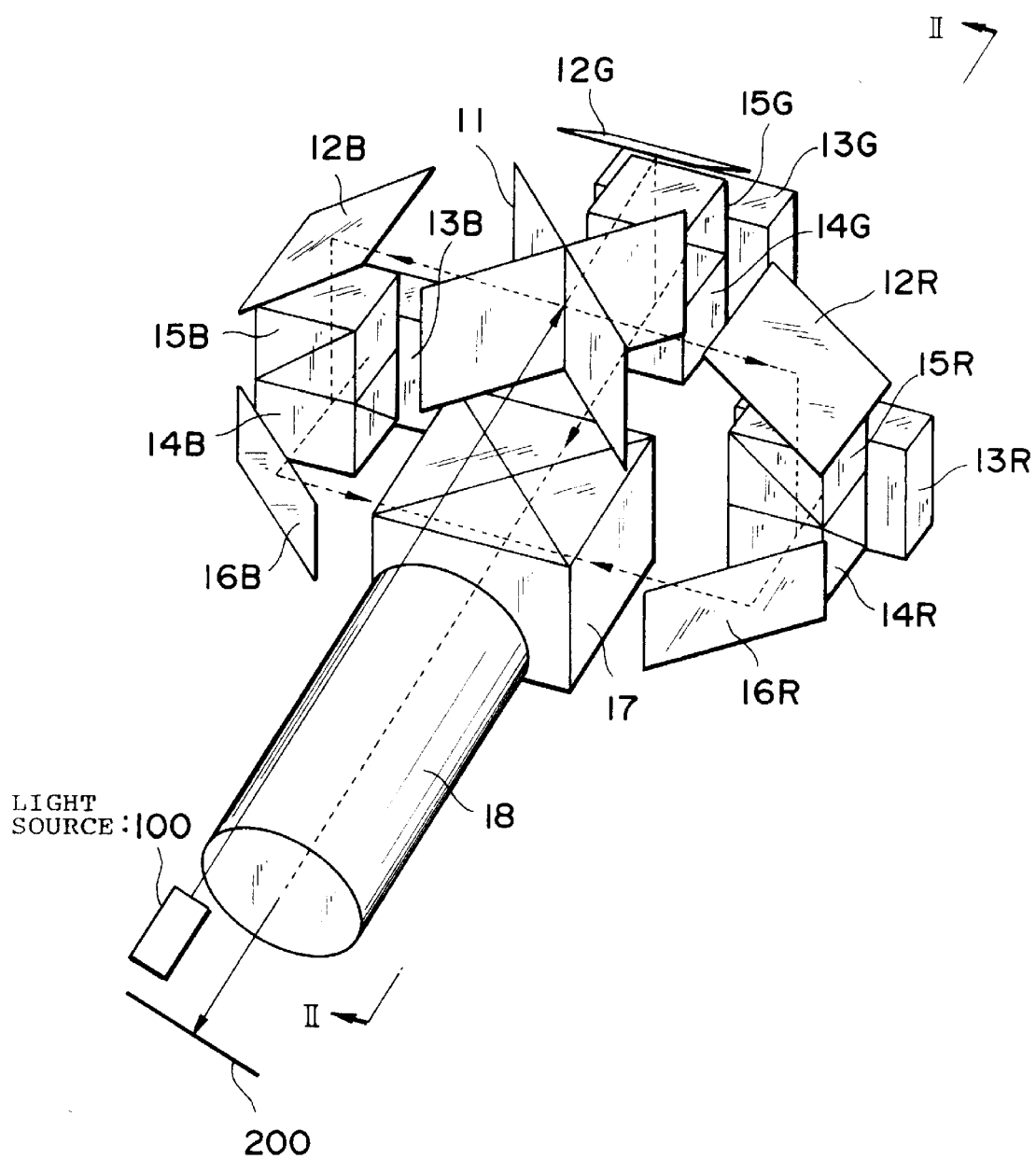
FIG. 2 is a perspective view to show the configuration of the first embodiment of the projection type display apparatus according to the present invention.
Figure 3:
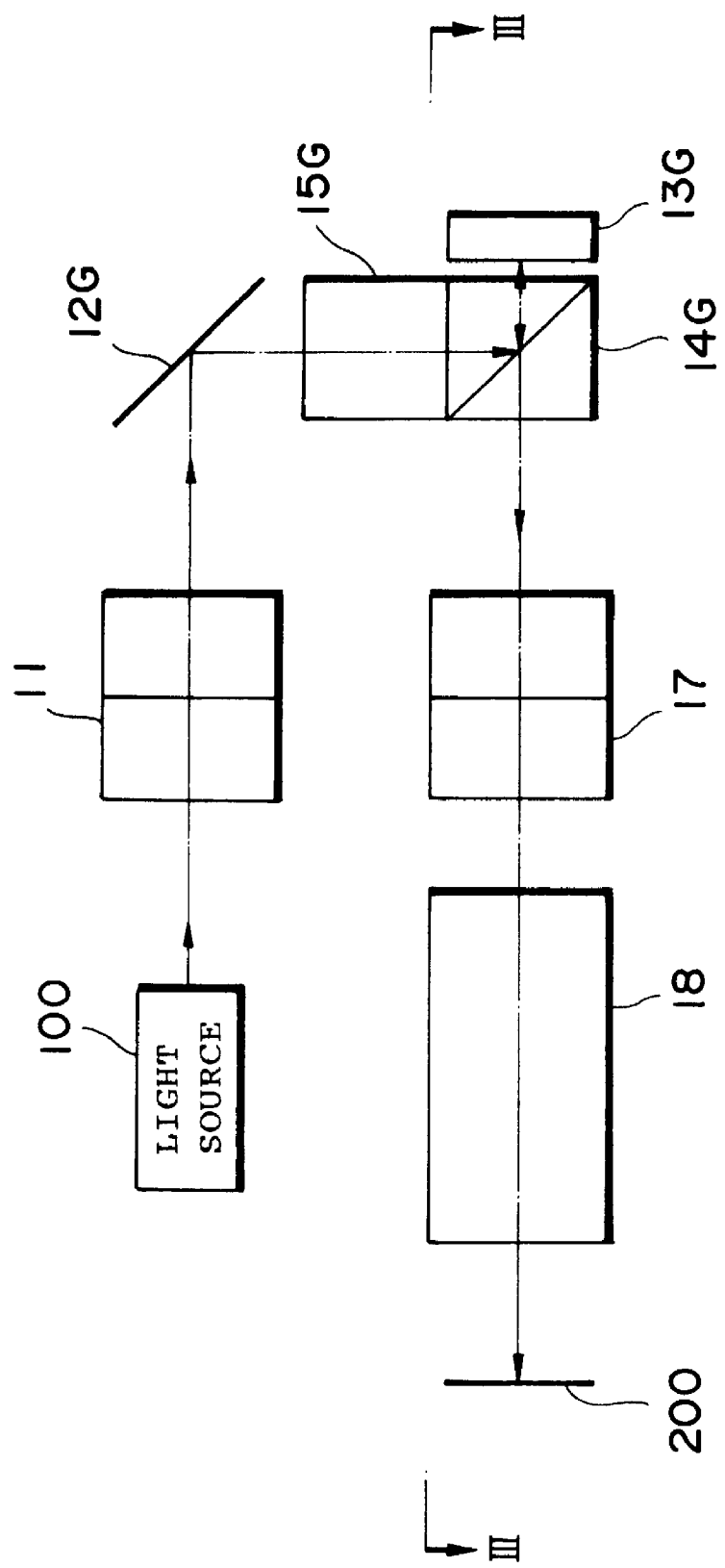
FIG. 3 is a drawing to show the configuration of the first embodiment of the above projection type display apparatus, taken along the line II—II in FIG. 2.
Figure 4:
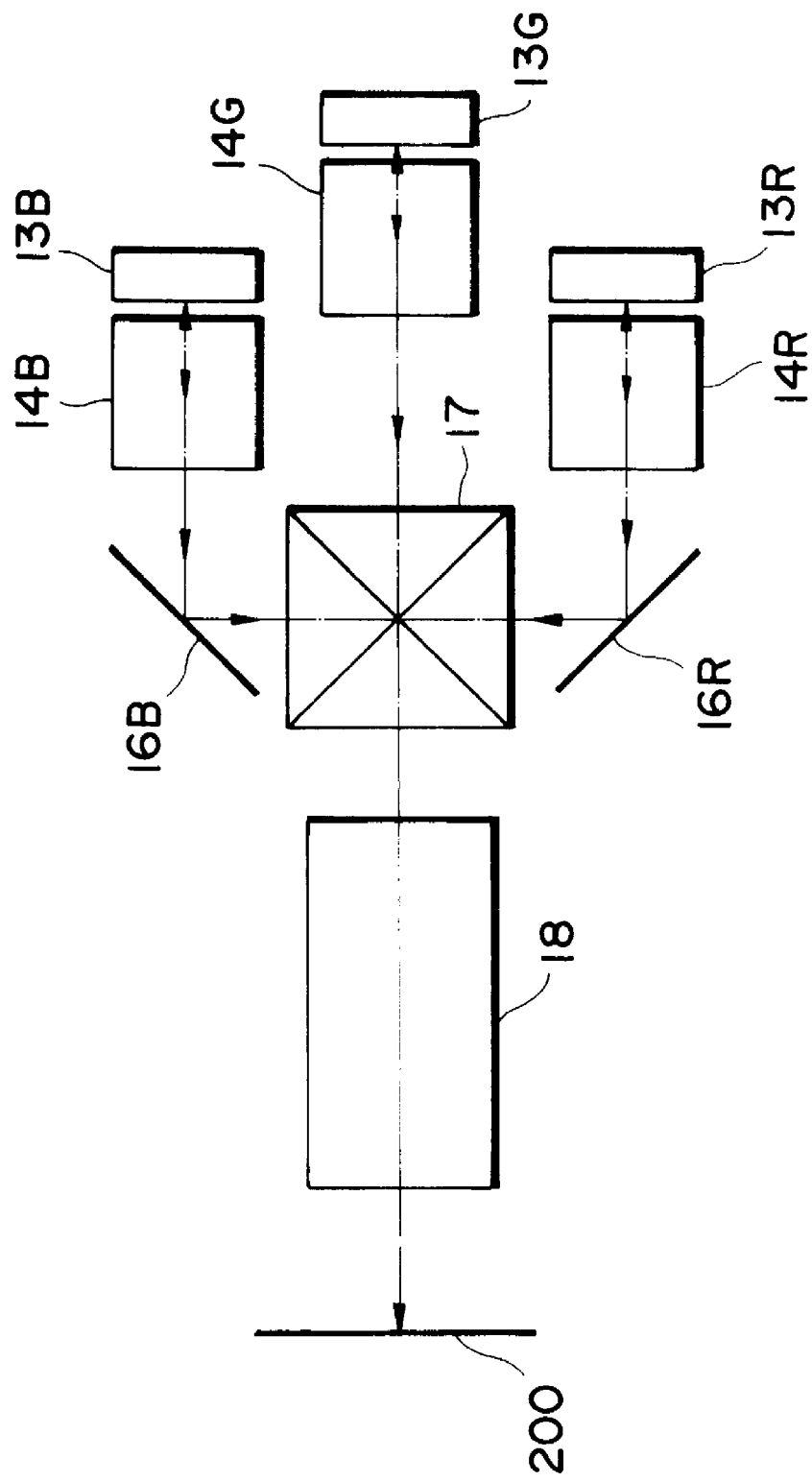
FIG. 4 is a drawing to show the configuration of the first embodiment of the above projection type display apparatus, taken along the line III—III in FIG. 3.

First, the configuration of the first embodiment of the projection type display apparatus according to the present invention is explained referring to FIG. 2 to FIG. 4. FIG. 2 is a perspective view to show the configuration of the first embodiment of the projection type display apparatus according to the present invention. FIG. 3 is a view to show the configuration of the first embodiment, taken along the line II—II and observed along the arrows in FIG. 2. FIG. 4 is a view to show the configuration of the first embodiment, taken along the line III—III and observed along the arrows in FIG. 3.

The first embodiment of the projection type display apparatus has a cross dichroic mirror 11 as a color separating means for separating light from a light source 100 into color light beams of red (R), green (G), and blue (B); mirrors 12R, 12G, 12B for reflecting the respective color light beams R, G, B separated into by the cross dichroic mirror 11; spatial light modulators 13R, 13G, 13B, such as phase difference modulation type liquid crystal light valves, corresponding to the respective color light beams R, G, B; principal polarizing beam splitters 14R, 14G, 14B receiving the respective color light beams R, G, B as incident light, polarizing the respective beams to project them to the spatial light modulators 13R, 13G, 13B, and analyzing reflected light beams from the spatial light modulators 13R, 13G, 13B; pre-polarizing beam splitters 15R, 15G, 15B disposed each on the incidence side of the above incident light (the light from the cross dichroic mirror 11) with respect to the principal polarizing beam splitter 14R, 14G, 14B, for raising the purity of polarization of the light projected to the spatial light modulators 13R, 13G, 13B; mirrors 16R, 16B; a cross dichroic prism 17 as a color combining means for combining the light beams analyzed by the respective principal polarizing beam splitters 14R, 14G, 14B with each other; and a projection optical system 18 (a projection lens) for projecting the light obtained through analyzation and color combination to a screen 200 or the like.

Here, the spatial light modulators 13R, 13G, 13B may be spatial light modulators of the so-called electrical writing type or spatial light modulators of the optical writing type. When the spatial light modulators 13R, 13G, 13B are of the optical writing type, CRTs or the like are separately prepared as writing light sources.

Each polarizing beam splitter 15R, 15G, 15B, 14R, 14G, 14B has such characteristics as to reflect the s-polarized light component but transmit the p-polarized light component. It is, however, noted that each polarizing beam splitter may have reversed characteristics.

In the first embodiment the light from the light source 100 is separated into the color light beams of red (R), green (G), and blue (B) by the cross dichroic mirror 11. Then these color light beams R, G, B are reflected by the respective mirrors 12R, 12G, 12B to be guided to the corresponding pre-polarizing beam splitters 15R, 15G, 15B.

Out of the color light beam G incident into the pre-polarizing beam splitter 15G, the p-polarized light component travels through the pre-polarizing beam splitter 15G to enter the principal polarizing beam splitter 14G. On the other hand, the s-polarized light component is reflected by the pre-polarizing beam splitter 15G so as not to enter the principal polarizing beam splitter 14G. The p-polarized light component transmitted by the pre-polarizing beam splitter 15G is incident to the principal polarizing beam splitter 14G arranged at the angle of 90° relative to the pre-polarizing beam splitter 15G. Because of this shift of 90°, the p-polarized light component transmitted by the pre-polarizing beam splitter 15G is incident as an s-polarized light component into the principal polarizing beam splitter 14G. The incident light into the pre-polarizing beam splitter 15G may be arranged to be incident into the side face of the pre-polarizing beam splitter 15G (which means to change the incident direction). In this case, when set in the same direction as the principal polarizing beam splitter 14G, the pre-polarizing beam splitter 15G reflects the s-polarized light component, so that only the s-polarized light component is incident into the principal polarizing beam splitter 14G located below. The principal polarizing beam splitter 14G reflects the s-polarized light component to project the s-polarized light component to the spatial light modulator 13G. The reflected light as modulated by the spatial light modulator 13G is analyzed by the principal polarizing beam splitter 14G, and the p-polarized light component among the reflected light is guided through the principal polarizing beam splitter 14G into the cross dichroic prism 17.

The above description concerned the color light beam G incident into the pre-polarizing beam splitter 15G, but the same can be applied also to the color light beams R, B incident into the pre-polarizing beam splitters 15R, 15B. However, the light analyzed by the principal polarizing beam splitter 14R, 14B is reflected by the mirror 16R, 16B, respectively, to be guided to the cross dichroic prism 17. The light beams analyzed by the principal polarizing beam splitters 14R, 14G, 14B are combined with each other by the cross dichroic prism 17 and thereafter the resultant light is projected through the projection lens 18 onto the screen 200.

In the first embodiment, the principal polarizing beam splitters 14R, 14G, 14B and the pre-polarizing beam splitters 15R, 15G, 15B are formed of optical glass substrates each made of transparent material with the absolute value of the photoelastic constant being no more than $1.5 \times 10^{-8}$ $cm^2/N$ for the wavelengths ($\lambda$=0.4 to 0.7 $\mu$m) of the incident light into the polarizing beam splitter.
(Composition of glass)

As an example of the transparent material as described above, a composition of an optical glass showing a very small absolute value of the photoelastic constant is as follows in % by weight on an oxide basis.

| | |
|---|---|
| $SiO_2$ | 17.0–27.0% |
| $Li_2O + Na_2O + K_2O$ | 0.5–5.0% |
| PbO | 73.0–75.0% |
| $As_2O_3 + Sb_2O_3$ | 0–3.0% |

The reason why the composition range of each component is determined as described above in this example is as follows.

Figure 8:
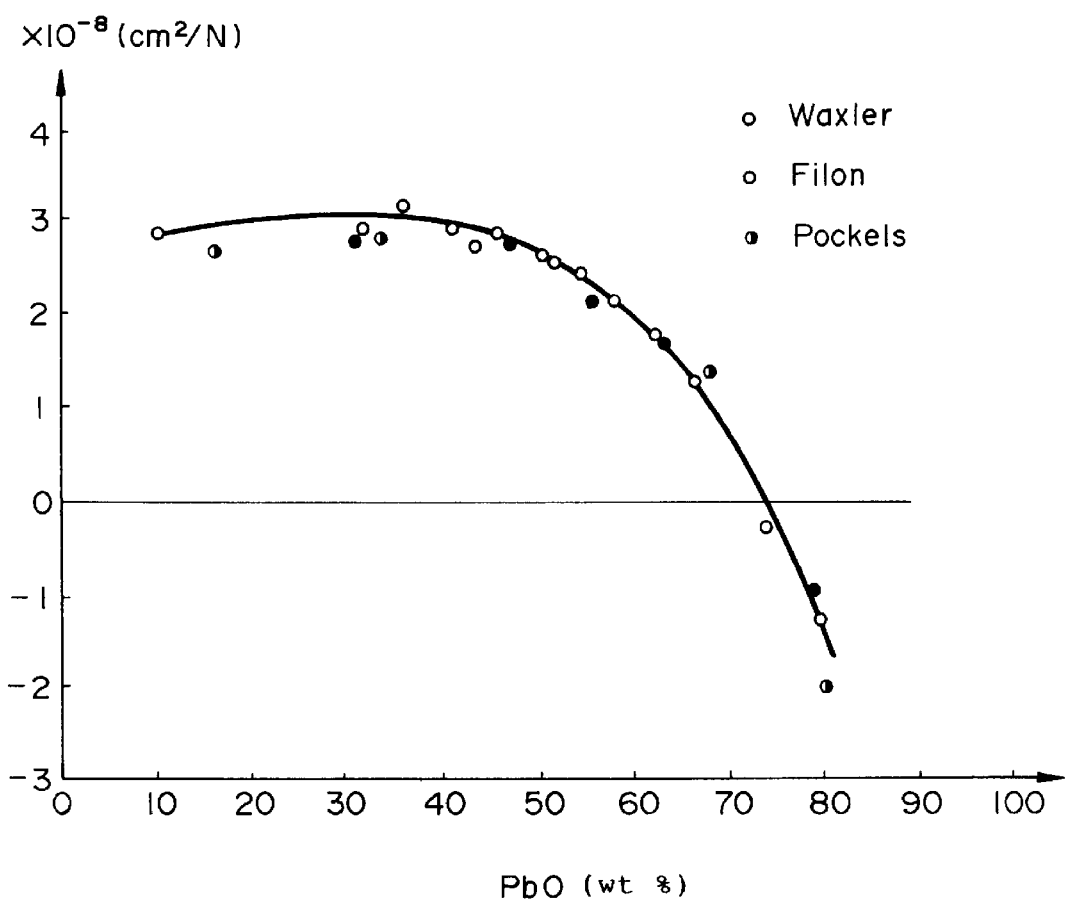
FIG. 8 is a drawing to show a graph of a relation of content (% by weight) of PbO in the transparent material as a substrate material of the polarizing beam splitter against photoelastic constant of the transparent material.

First, PbO (lead oxide) is used in order to control the value of the photoelastic constant C near zero, utilizing the fact that in a glass based on the composition containing PbO, the value of the photoelastic constant C greatly depends upon the content of PbO; more specifically, utilizing the fact that the value of photoelastic constant C decreases with an increase of the content of PbO to reach zero at a certain amount thereof and to take negative values after that (see FIG. 8). A conceivable reason why the values of photoelastic constant C change depending upon the content of PbO is that the coordination of lead ion changes with an increase of the content thereof. By keeping the content of PbO, for example, in the range of 73 to 75% by weight, the value of the photoelastic constant C can be set near zero. The wavelengths of the incident light range from 500 to 650 nm.

$SiO_2$ is a glass forming component in the optical glass of this example and the glass preferably contains 17 or more % by weight of $SiO_2$. However, the content of $SiO_2$ is limited to 27% by weight because the content of PbO is 73 to 75% by weight.

The alkali metal components of $Li_2O+Na_2O+K_2O$ have effects of decreasing the melting temperature and the glass transition temperature of glass and enhancing stability against devitrification of glass, and they are preferably contained in 0.5 or more % by weight. However, the content over 5% by weight is not preferred because chemical durability of the glass is considerably affected.

$AS_2O_3$, $Sb_2O_3$ or ($As_2O_3+Sb_2O_3$) capable of functioning as a defoaming agent, may be introduced into raw materials for the glass, as desired. However, the content thereof over 3% by weight is not preferred because it would result in losing devitrification resistance of the glass, spectral transmittance thereof, etc.

A process for producing the above optical glass is as follows. Namely, oxides, carbonates, nitrates, etc. of the respective elements are used as starting materials of the respective components. They are weighed in a desired rate as raw composition materials and mixed, and the resultant raw composition materials are heated to 1,000° to 1,300° C., and subjected to refining and stirring to even the mixture on the whole. After that, the resultant raw material is cast into a casting mold preliminarily heated, and then is annealed there, thereby readily producing the desired optical glass.
(Measurement and evaluation of photoelastic constant)

Here are explained specific examples of the optical glass as described above, the configuration of a measuring apparatus, and measurement results, referring to FIG. 5 to FIG. 8.

Figure 6:
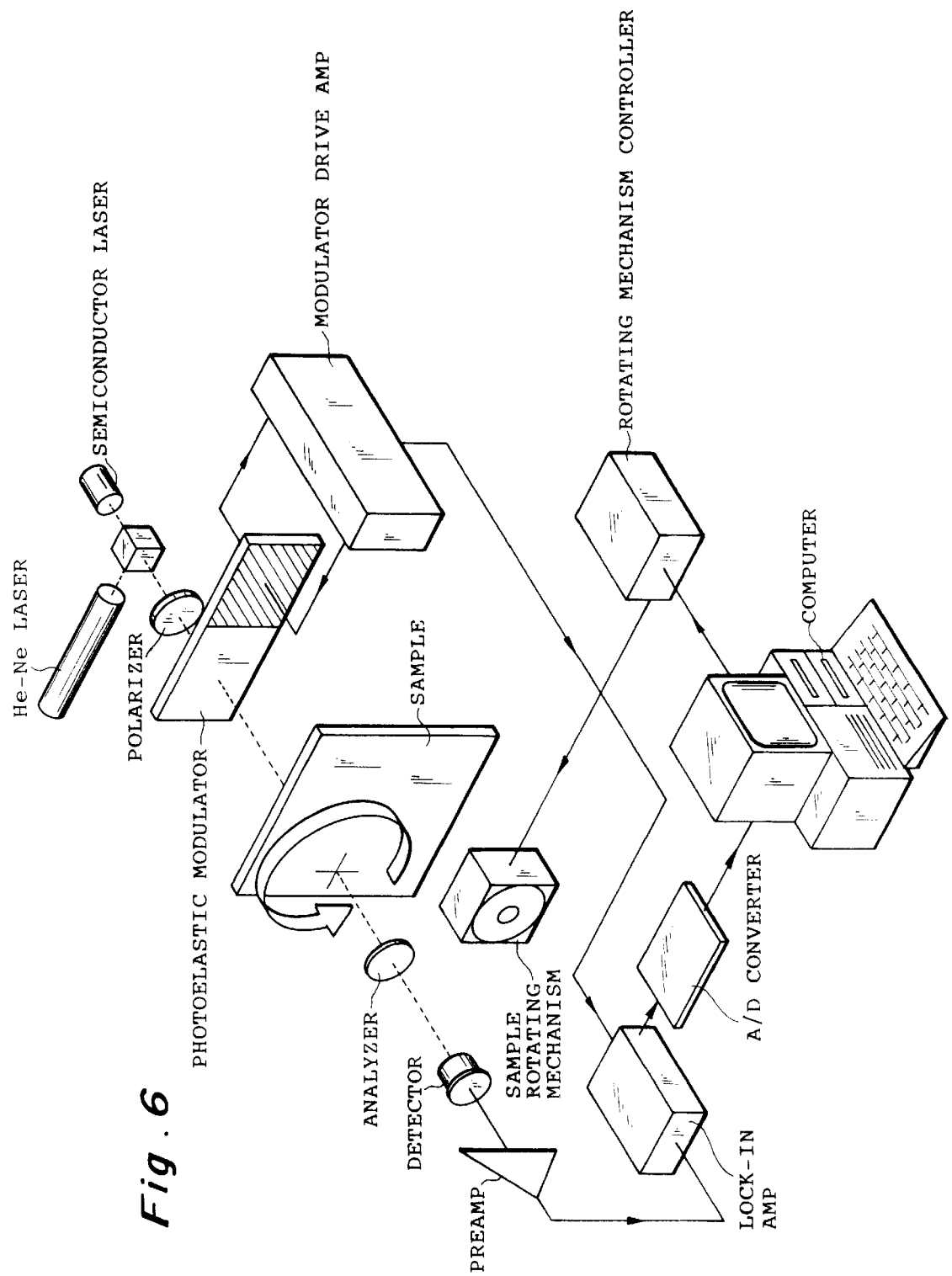
FIG. 6 is a drawing to show the configuration of a double refraction measuring apparatus for measuring the photoelastic constant, which is defined as a double refraction amount per unit stress applied on a sample (i.e., (photoelastic constant)=(double refraction amount in sample)/(stress applied to sample))

In this invention, double refraction measurement is carried out using the light of known wavelength $\lambda$ while a known uniaxial stress $\sigma_2$ with $\sigma_1=\sigma_3=0$ in above Eqs. (1) and (2) is exerted on each sample of a known size L to be measured, thereby measuring the optical path difference $\Delta R$ (Eq. (4)). The photoelastic constant $C=C_1-C_2$ can be obtained from above Eq. (4), based on the optical path difference $\Delta R$ thus obtained. (As to the details of this method for measuring the "photoelastic constant C," reference should be made to the operating guide for the double refraction measuring apparatus ADR-150LC as detailed later; or Etsuhiro, MOCHIDA, "Optical Technology Contact," Vol. 27, No. 3, p 127, 1989.) FIG. 6 is a schematic, structural drawing of the double refraction measuring apparatus shown in the above reference, MOCHIDA. The double refraction measuring apparatus available from Oak Seisakusho (trade name: ADR-150LC) was used for actual measurement.

Figure 7:
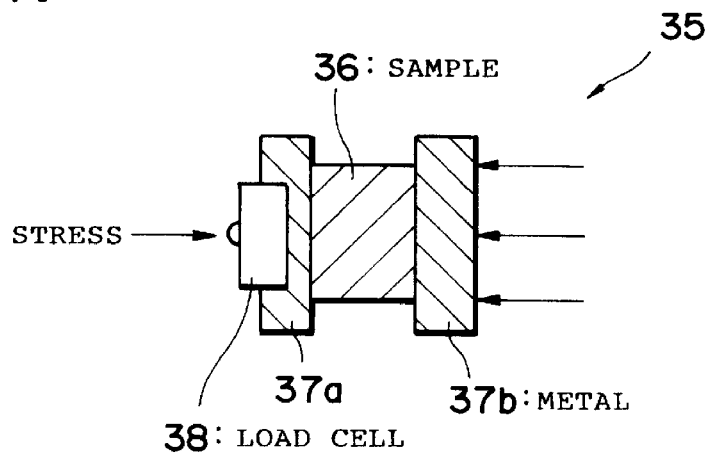
FIG. 7 is a drawing to show the configuration of a jig for applying the stress on the sample.

In this measuring apparatus, a "sample" in the drawing is held as pinched by a sample jig for applying the uniaxial stress to the sample, as shown in FIG. 7, and a double refraction amount of the sample is measured while applying the predetermined stress on the sample. The sample jig of FIG. 7 is comprised of a pair of metal blocks 37a and 37b (in the size of 40 to 50 mm×30 to 40 mm and in the thickness of 25 to 30 mm) capable of holding the sample 36 between them; and a load cell 38 (in the diameter of 20 mm and in the thickness of 9.5 mm; trade name: 9E01-L32-100K available from Nihon Denshi Sanei Kabushiki Kaisha) disposed in the metal block 37a. By setting the load cell 38 as described, the value of stress applied on the sample can be monitored.

The size of the above sample 36 is 10 mm×15 mm×20 mm, the size of the stress plane is 10 mm×20 mm, the size of a light transmitting surface is 15 mm×20 mm, and the length of the light transmitting path is 10 mm.

Samples were produced in accordance with the steps as described above. Namely, oxides, carbonates, nitrates, etc. of the respective elements were prepared as starting materials of the respective components, and these were highly purified. After that, they were weighed and mixed as a raw composition material at a predetermined rate, and the raw composition material was heated to 1,000° to 1,300° C. to melt, and was then subjected to refining and stirring to even the mixture on the whole. Then the raw material thus obtained was cast into the casting mold preliminarily heated and then was annealed there, thereby producing the optical glass as a sample.

Samples prepared for measurement are sample numbers 1 to 7 and BK7 prepared for comparison, as shown in FIG. 5. Numerical values in the table indicate component rates in % by weight on an oxide basis, and the sum becomes 100% for each sample.

The photoelastic constants of the glasses thus obtained were measured for the wavelength $\lambda=540$ nm, using the above measuring apparatus. The photoelastic constants C were calculated by measuring optical path differences $\Delta R$ while applying the known uniaxial stress $\sigma_2$ with $\sigma_1=\sigma_3=0$ in the above equations, using the light of the known wavelength $\lambda$ and the samples of the known size. Namely, each of the above photoelastic constants C is obtained from (double refraction amount of sample)/(stress applied on sample). (In other words, a photoelastic constant means a double refraction amount per unit stress.) Measurement results are shown in FIG. 5. FIG. 8 shows a graph in which the content of lead oxide (PbO) is taken on the abscissa and the photoelastic constant on the ordinate. As the content of lead oxide increases, the photoelastic constant decreases nearly linearly, reaches zero at a certain point, and then takes negative values after that point, as seen. FIG. 5 also includes measurement results of the component rate of BK7 frequently used heretofore and the photoelastic constant thereof for the light of the wavelength $\lambda=540$ nm, as a comparative example. It is seen that the photoelastic constants of the optical glasses of sample numbers 1 to 7 are far smaller than that of BK7, particularly, that the photoelastic constants of the optical glasses of sample numbers 4 to 6 are values in the range where they can be regarded as substantially zero ($-0.1\times10^{-8}$ cm$^2$/N to $+0.1\times10^{-8}$ cm$^2$/N).

The graph of FIG. 8 is the one shown in H. Aben, C. Guillemet, "Photoelasticity of Glass", published by Springer-Verlag (1993). In this graph, the numerical values described in the following references, Waxler (1), Filon (2), and Pockels (3), are plotted.

(1) Waxler, R. M., "The stress optical coefficient of plate glass," Glass Ind. 34, 258–259, 283 (1953).
(2) Filon, L. N. G., "On the dispersion in artificial double refraction," Phil. Trans. A 207, 263–306 (1907).
(3) Pockels, F., "Uber die Anderung des optischen Verhaltens verschiedener Glaser durch elastische Deformation," Ann. Phys. Ser. IV, 7, 745–771 (Beam splitter).

Next explained with FIG. 9 to FIG. 13 is the configuration of the polarizing beam splitter to which the optical glass member as explained above is applied. The above polarizing beam splitter has the following aspects.

(Aspect 1)

The polarizing beam splitter in the present invention is a polarizing beam splitter having a dielectric multilayer film formed on transparent material members;

wherein the dielectric multilayer film is comprised of at least a first dielectric multilayer film and a second dielectric multilayer film, wherein each of the first and second dielectric multilayers comprises an alternate layer of a lamination of n cycles (where n is an arbitrary integer), each basic cycle being defined as two layers of a high-index substance and a low-index substance of optical thicknesses $\lambda_1/4$, $\lambda_2/4$ at two different center wavelengths $\lambda_1$, $\lambda_2$, respectively, and thin-film adjuster layers formed on either side of the alternate layer and comprised of either the high-index substance or the low-index substance of an optical thickness $\lambda_1/8$, $\lambda_2/8$, and wherein the alternate layer of the first dielectric multilayer film and the alternate layer of the second dielectric multilayer film are comprised of combinations of mutually different types of substances.

(Aspect 2)

In the above polarizing beam splitter, the high-index substance $TiO_2$ and low-index substance $SiO_2$ are used for the alternate layer of the first dielectric multilayer film, and the high-index substance $TiO_2$ and low-index substance $Al_2O_3$ are used for the alternate layer of the second dielectric multilayer film.

(Aspect 3)

Further, in the above polarizing beam splitter, the high-index substance $TiO_2$ and low-index substance $SiO_2$ are used for the alternate layer of the first dielectric multilayer film, and the high-index substance $ZrO_2$ and low-index substance $MgF_2$ for the alternate layer of the second dielectric multilayer film.

Figure 9:
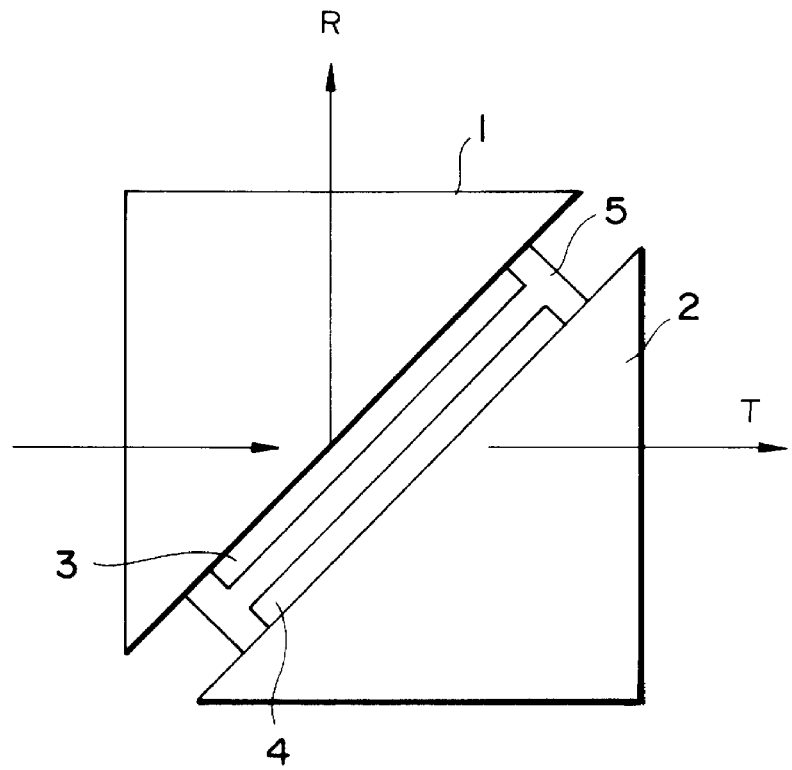
FIG. 9 is a drawing to show the configuration of the first embodiment of the polarizing beam splitter applicable to the projection type display apparatus according to the present invention.

Specific arrangements will be explained referring to FIG. 9 to FIG. 13. FIG. 9 shows the configuration of the polarizing beam splitter in which a prism 1 being the first transparent material member (on which the adjuster layers 1C and the alternate layer 13 of the first dielectric multilayer film 3 are laminated, as shown in FIG. 12) and a prism 2 being the second transparent material member (on which the adjuster layers 2C and the alternate layer 23 of the second dielectric multilayer film 4 are laminated, as shown in FIG. 11) are bonded to each other with an optical adhesive 5.

In this configuration example, the prism 1 and prism 2 have the refractive index $n_s$ of 1.84. The optical adhesive has the refractive index $n_b=1.52$. FIG. 9 shows reflected light R and transmitted light T when a light beam X is incident at 45°. The transmitted light T includes the s-polarized light component $T_s$ and the p-polarized light component $T_p$.

Figure 11:
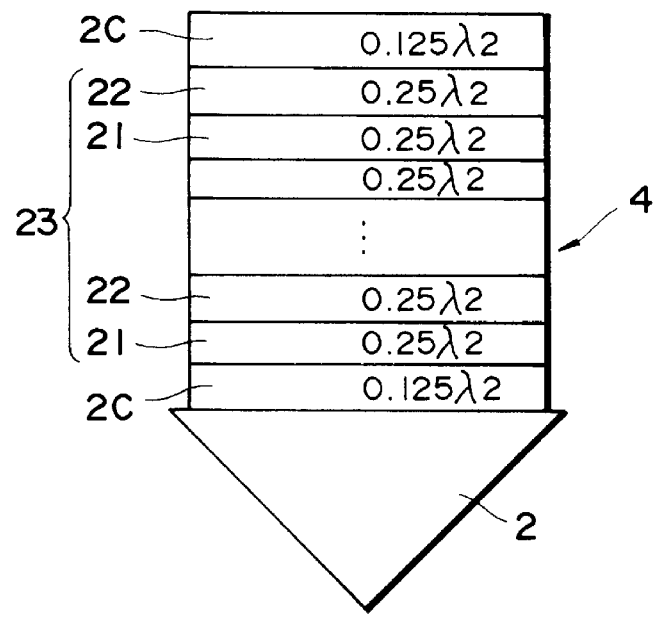
FIGS. 11 and 12 are drawings to show the structure of the first and second dielectric multilayer films shown in FIG. 9.
Figure 12:
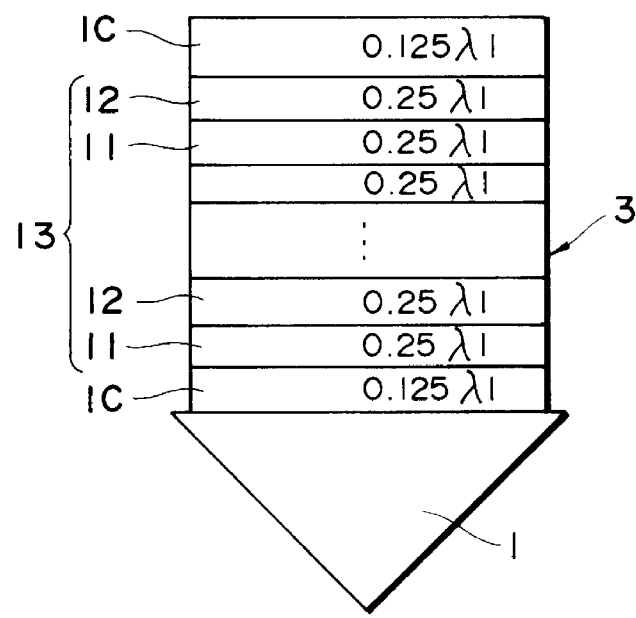

Referring to FIG. 12, the alternate layer 13 of the first dielectric multilayer film includes alternately arranged layers, $TiO_2$ layers 11 of the high-index substance $nH_1=2.38$ and $Al_2O_3$ layers 12 of the low-index substance $nL_1=1.65$, each in the optical thickness $\lambda_1/4$ at the center wavelength $\lambda_1=680$ nm. On the other hand, referring to FIG. 11, the alternate layer 23 of the second dielectric multilayer film includes alternately arranged layers, $TiO_2$ layers 21 of the high-index substance $nH_2=2.38$ and $SiO_2$ layers 22 of the low-index substance $nL_2=1.47$, each in the optical thickness $\lambda_2/4$ at the center wavelength $\lambda_2=420$ nm.

Further, the adjuster layer 1C or 2C in the optical thickness $\lambda_1/8$ or $\lambda_2/8$, respectively, is interposed between the alternate layer 13 or 23 of the above first or second dielectric multilayer film and the prism 1 or prism 2.

Let us consider a case in which an angle of incidence of a beam deviates ±2.5° from the design standard incidence angle 45° in the polarizing beam splitter having the above configuration.

In this case, the high-index substance 11 and the low-index substance 12 used in the alternate layer 13 of the first dielectric multilayer film for the high-angle side (corresponding to the short-wavelength side in the use wavelength region) are selected to satisfy the following Brewster condition (Eq. 5) at the angle $\theta_1=47.5°$ at which the light beam is incident to the interface between the transparent substrate 1 and the first dielectric multilayer film 13 from the transparent substrate 1. In this configuration example, $TiO_2$ was selected for the high-index layer 11 and $Al_2O_3$ for the low-index layer 12 as a combination of materials or substances forming the alternate layer 13 of the first dielectric multilayer film. On the other hand, the high-index substance 21 and low-index substance 22 used in the alternate layer 23 of the second dielectric multilayer film for the low-angle side (corresponding to the long-wavelength side in the use wavelength region) are selected to satisfy the following Brewster condition (Eq. 6) at the angle $\theta_2=42.5°$ at which the light beam is incident to the interface between the transparent substrate 2 and the second dielectric multilayer film 23 from the transparent substrate 2. In this configuration example, $TiO_2$ was selected for the high-index layer 21 and $SiO_2$ for the low-index layer 22 as a combination of materials forming the alternate layer 23 of the second dielectric multilayer.

$$\lambda_1 > \lambda_2$$

$$\lambda_1, \theta_1; nH_1 \cos\theta H_1 = nL_1 \cos\theta L_1 \quad (5)$$

$$\lambda_2, \theta_2; nH_2 \cos\theta H_2 = nL_2 \cos\theta L_2 \quad (6)$$

In the above equations, $\theta_1$; an angle of a beam incident to the interface between the first dielectric multilayer film and the transparent substrate 1 from the transparent substrate 1

$\theta_2$; an angle of a beam incident to the interface between the second dielectric multilayer film and the transparent substrate 2 from the transparent substrate 2

Figure 10:
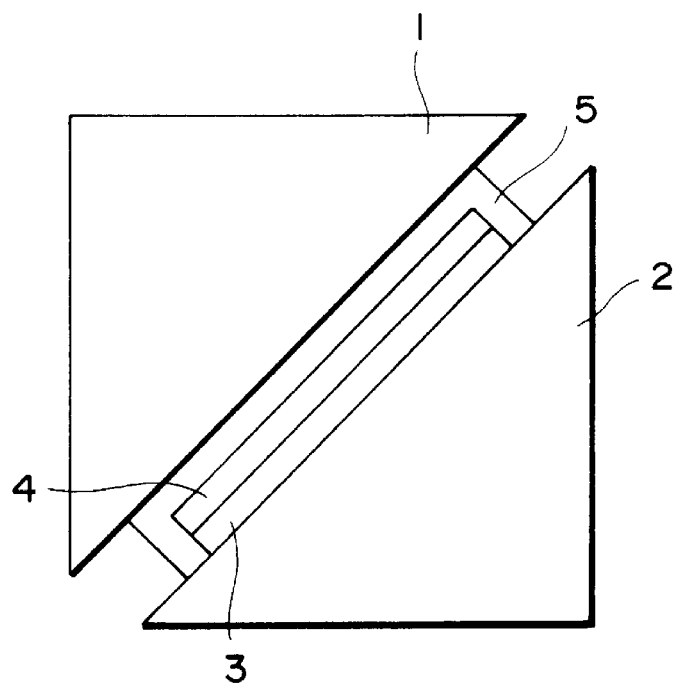
FIG. 10 is a drawing to show the configuration of the second embodiment of the polarizing beam splitter applicable to the projection type-display apparatus according to the present invention.
Figure 13:
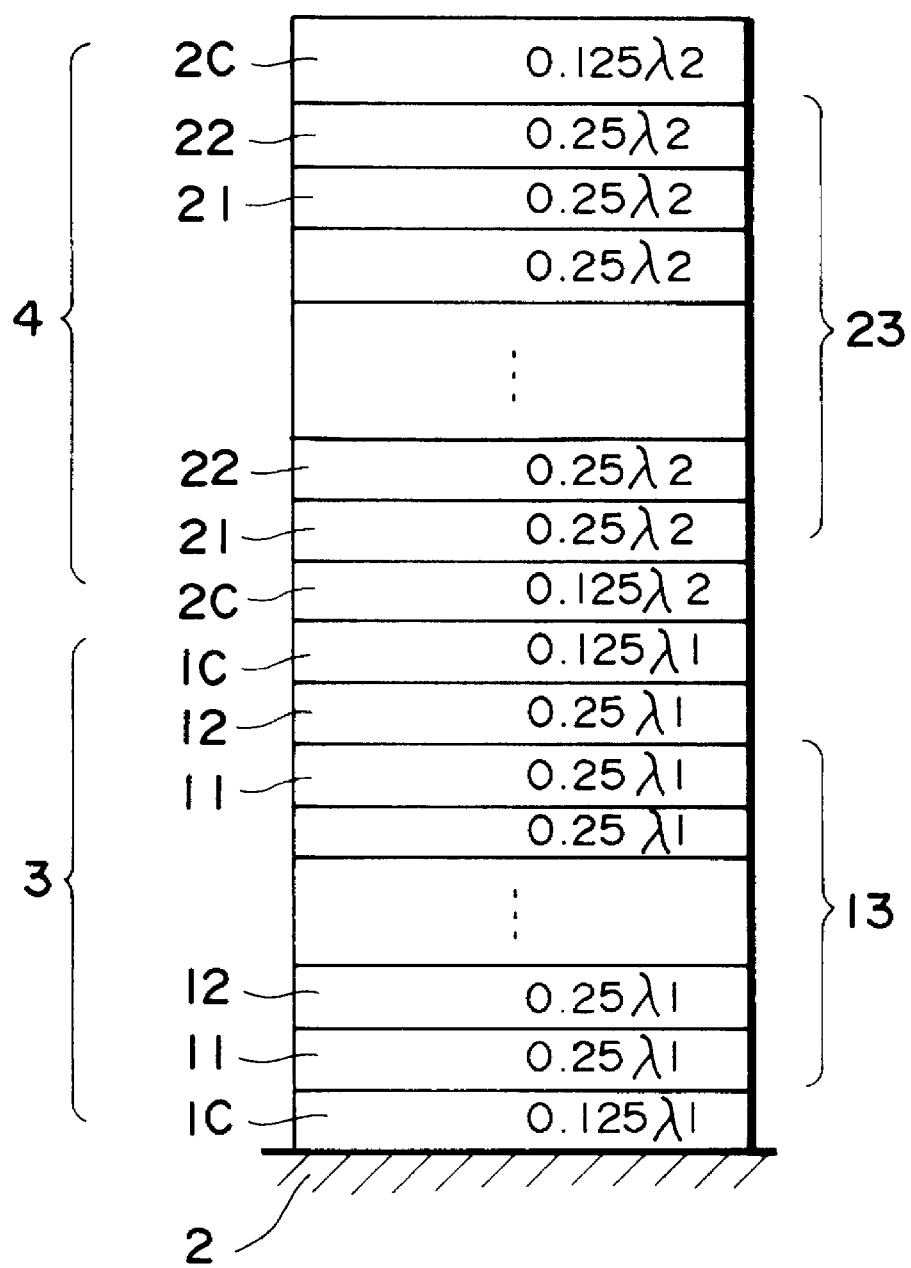
FIG. 13 is a drawing to show the structure of the first and second dielectric multilayer films shown in FIG. 10.

$nH_1$, $nL_1$; refractive indices of the high-index layer and low-index layer in the alternate layer of the first dielectric multilayer film at the design standard wavelength $\lambda_1$ $nH_2$, $nL_2$; refractive indices of the high-index layer and low-index layer in the alternate layer of the second dielectric multilayer film at the design standard wavelength $\lambda_2$ $\theta H_1$, $\theta L_1$; an angle of incidence to the interface from each of the high-index layers and low-index layers in the alternate layer of the first dielectric multilayer film at the design standard wavelength $\lambda_1$ $\theta H_2$, $\theta L_2$; an angle of incidence to the interface from each of the high-index layers and low-index layers in the alternate layer of the second dielectric multilayer film at the design standard wavelength $\lambda_2$ Further, an application example of the above polarizing beam splitter is shown in FIG. 10 and FIG. 13. This configuration example is arranged, as shown in FIG. 10, in such a manner that on the transparent member 2 the first dielectric multilayer film 3 and second dielectric multilayer film 4 are consecutively laminated and the transparent member 1 is further placed through the adhesive layer 5. FIG. 13 shows the detailed configuration of this dielectric multilayer film. This configuration of FIG. 10 has such an advantage that film formation of the low-index layers and high-index layers can be completed in a batch. In other words, using the configuration arrangement of the polarizing beam splitter as in this application example, the film formation of the dielectric multilayer films forming the splitter can be carried out in a batch, which enables to improve productivity.

(Optical evaluation of polarizing beam splitter)

Figure 14:
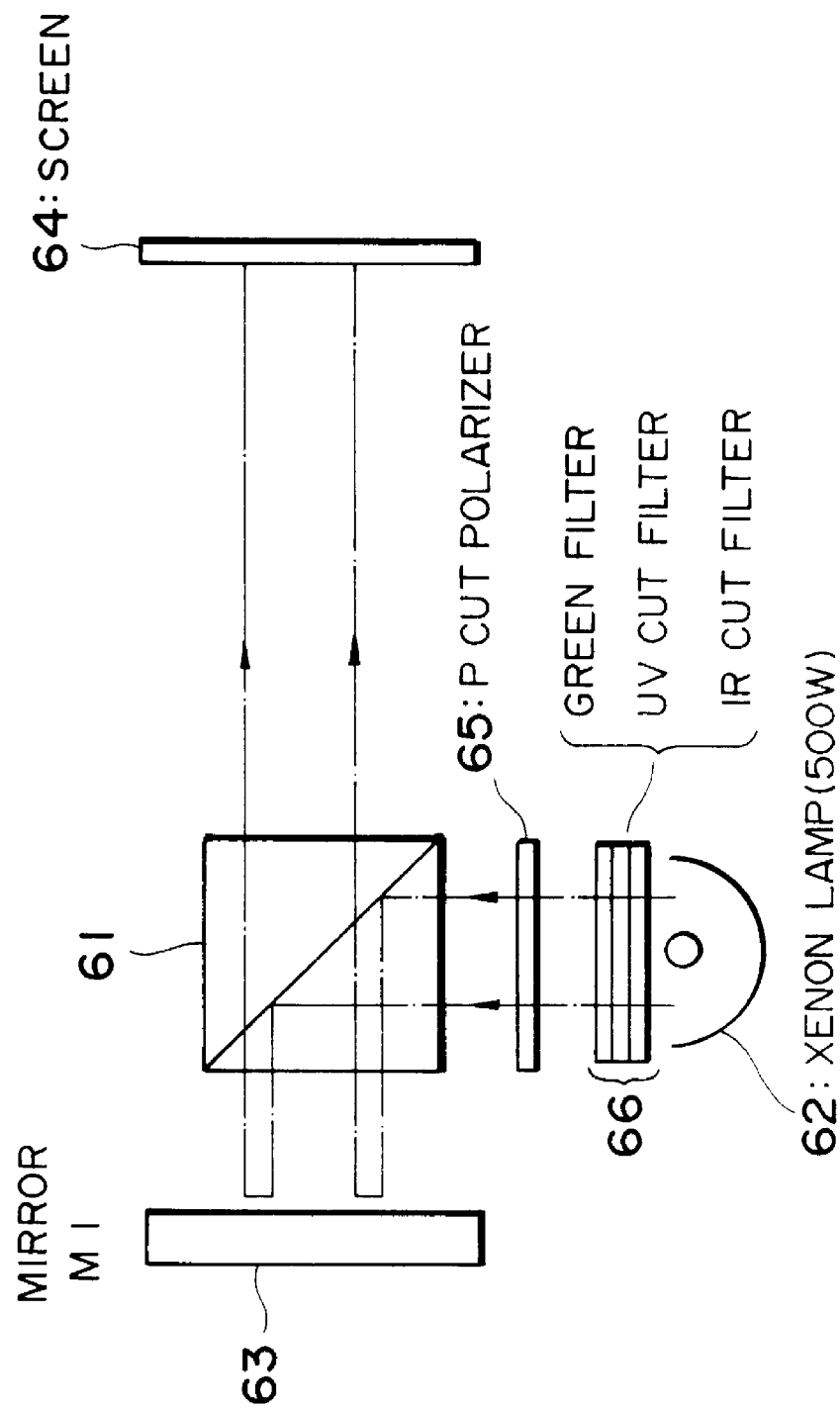
FIG. 14 is a drawing to show the configuration of an apparatus for evaluating the polarizing beam splitter.
Figure 16:
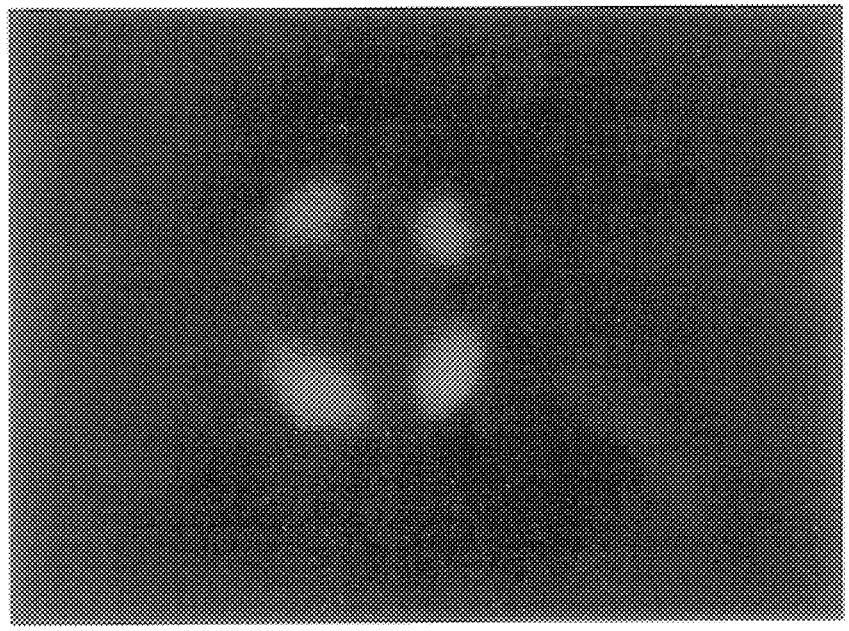
FIGS. 16 to 18 are photographs to show illumination unevenness obtained when the polarizing beam splitters made of the transparent materials listed in FIG. 15 were evaluated by the evaluating apparatus shown in FIG. 14.

Next explained are results of evaluation using the evaluating apparatus shown in FIG. 14 to evaluate the polarizing beam splitter in the above configuration (the configuration of FIG. 9). The polarizing films of the polarizing beam splitter used in this evaluation were designed with the center wavelength at $\lambda=540$ nm being the wavelength of green.

The evaluation was carried out as follows. Light from a xenon lamp 62 (500 W) as a light source was emitted to a polarizing beam splitter 61 (sample), an image of the xenon lamp 62 was projected via a mirror 63 onto the screen 64, photographs of illuminance unevenness on the screen 64 were taken with a camera, and evaluation was done with the photographs. The evaluation apparatus of FIG. 14 has a filter group 66 composed of a green wavelength transmitting filter, an ultraviolet (UV) cut filter, and an infrared (IR) cut filter, and a p-polarized light component cut polarizer 65 in the optical path between the light source 62 and the polarizing beam splitter 61.

The following are average data with the wavelength of 480–610 nm and the incident angle of 0, +6, −6 degrees.

Transmission light T: $T_p$(p-polarized light component of transmission light)$\geq 80\%$;
$T_s$(s-polarized light component of transmission light) $\leq 0.02\%$; and Extinction ratio >4000.

Reflection light S: $R_p$(p-polarized light component of reflection light)>4%;
$R_s$(s-polarized light component of reflection light); and Extinction ratio >20.

Prepared were three types of optical glass substrates shown in FIG. 15, as the optical glass substrates of the above polarizing beam splitter (PBS). The photoelastic constant of the first glass (trade number: PBM 35) available from Ohara is $2.0 \times 10^{-8}$ $cm^2/N$, the photoelastic constant of the second glass (trade number: PBH 11) available from Ohara is $1.33 \times 10^{-8}$ $cm^2/N$, and the photoelastic constant of the glass obtained with the above method is $0.1 \times 10^{-8}$ or less $cm^2/N$.

Figure 17:
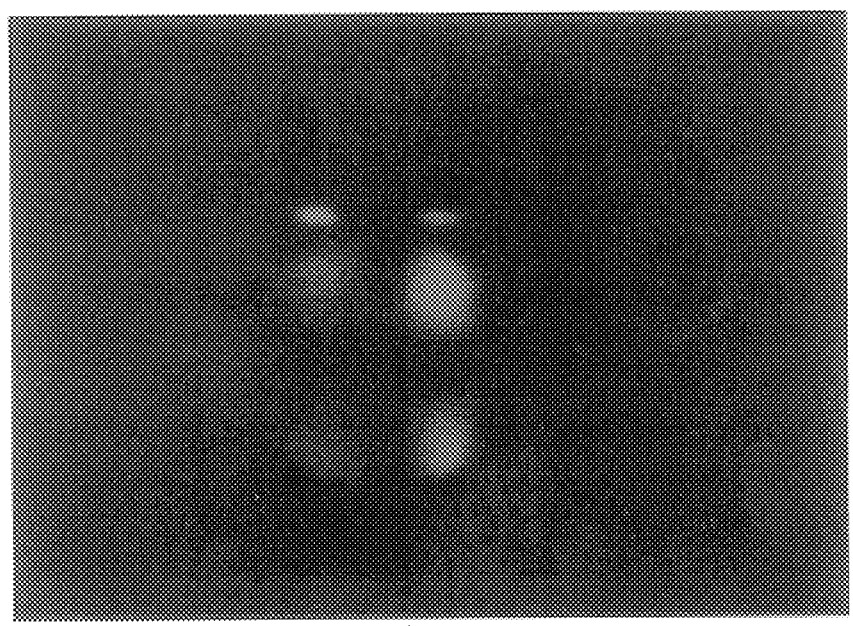
Figure 18:
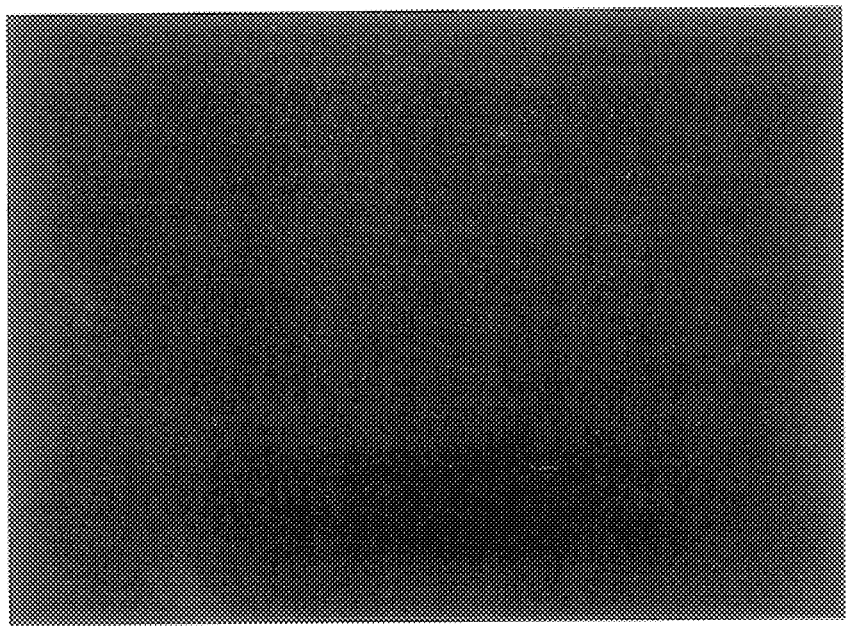

The evaluation apparatus of FIG. 14 was used to take photographs of illuminance unevenness on the screen 64 for the polarizing beam splitters made of the above glass substrates. As shown in FIG. 18, illuminance unevenness appeared very little in the use of the polarizing beam splitter (PBS) 61 using the optical glass of the present invention with the photoelastic constant C being substantially zero. It was also found that the PBS using the above PBH 11 was available for practical use (FIG. 17). Against it, the PBS using the above PBM 35 showed eminent illuminance unevenness, as apparent from the photograph of FIG. 16.

As explained above, any optical glass with the photoelastic constant near zero is ideal as a material for the principal polarizing beam splitters 14R, 14G, 14B and the pre-polarizing beam splitters 15R, 15G, 15B. From the above evaluation results that the PBS using PBM 35 with the photoelastic constant of $2.0 \times 10^{-8}$ $cm^2/N$ showed eminent illuminance unevenness but the PBS using PBH 11 with the photoelastic constant of $1.33 \times 10^{-8}$ $cm^2/N$ was practically usable without trouble, it was concluded that if the transparent members (optical glass substrates) with the absolute value being no more than $1.5 \times 10^{-8}$ $cm^2/N$ were used for the polarizing beam splitters employed in the projection type display apparatus, it was possible to attain the projection type display apparatus fully securing optically stable performance and sufficiently decreasing the image quality degradation of projection image, as compared with the conventional transparent material members (for example, BK7 with the photoelastic constant thereof being $2.78 \times 10^{-8}$ $cm^2/N$).

Thus, for example, if the range of the content of lead oxide is between about 64 and about 81% by weight (see FIG. 8) in the composition of the optical glass as described above, the absolute value of the photoelastic constant becomes not more than $1.5\times10^{-8}$ cm$^2$/N and such a material can be used as the substrate materials for the principal polarizing beam splitters 14R, 14G, 14B and the pre-polarizing beam splitters 15R, 15G, 15B. However, the polarizing beam splitter applied to the projection type display apparatus is preferably made using the transparent material with the absolute value of the photoelastic constant being no more than $0.5\times10^{-8}$ cm$^2$/N and more preferably, using the transparent material with the absolute value of the photoelastic constant being no more than $0.1\times10^{-8}$ cm$^2$/N (in the range of substantially zero), particularly taking the above evaluation results (FIG. 16 to FIG. 18) into consideration.

Since the photoelastic constant depends upon the wavelength of light, the composition or the like of the transparent material is changed with necessity according to the wavelength of incident light, i.e., depending upon either one associated wavelength of R, G, B in the present embodiment. Thus, the present embodiment employs the optical material with the absolute value of the photoelastic constant being no more than b $1.5\times10^{-8}$ cm$^2$/N for the wavelengths ($\lambda=0.4$ $\mu$m to 0.7 $\mu$m) of the incident light into the polarizing beam splitter.

The refractive index of BK7 as explained above is approximately 1.5, whereas the refractive index of the optical glass in the above composition is at least 1.8. Accordingly, use of the above optical glass permits the polarizing beam splitter to be formed as capable of being set at the angle of 45° relative to the optical axis. Compactification of the entire apparatus becomes possible by employing such polarizing beam splitters for at least the principal polarizing beam splitters 14R, 14G, 14B and pre-polarizing beam splitters 15R, 15G, 15B. If a polarizing beam splitter is formed using BK7, the polarizing beam splitter cannot be set at the setting angle of 45° because of its refractive index. Thus, the apparatus employing the polarizing beam splitters formed of the BK7 becomes large and heavy as a whole.

The first embodiment of the projection type display apparatus as explained above uses the principal polarizing beam splitters 14R, 14G, 14B comprised of the optical glass substrates each made of the transparent material with the absolute value of the photoelastic constant being no more than $1.5\times10^{-8}$ cm$^2$/N for the wavelengths (0.4 $\mu$m to 0.7 $\mu$m) of the incident light into the principal polarizing beam splitter 14R, 14G, 14B, but does not use the conventional liquid immersion type polarizing beam splitters as described above. By this, the present invention achieves the advantages of removing the various problems due to application of the conventional liquid immersion type polarizing beam splitters to the projection type display apparatus, such as the convection, dust, or bubble in the liquid as discussed previously, facilitating production, etc.

Since this embodiment employs the principal polarizing beam splitters 14R, 14G, 14B comprised of the substrates each made of the transparent material with the absolute value of the photoelastic constant being no more than $1.5\times10^{-8}$ cm$^2$/N for the predetermined wavelengths of the incident light into the principal polarizing beam splitter 14R, 14G, 14B, optically stable performance can be secured against an increase of stress due to a temperature change and the image quality degradation of projection image becomes sufficiently decreased.

In this embodiment there are provided the pre-polarizing beam splitters 15R, 15G, 15B. This enhances the purity of polarization (the s-polarized light component in the present embodiment) of the reading light irradiating the spatial light modulators 13R, 13G, 13B, which improves the extinction ratio and in turn improves the contrast of projection image obtained.

Further, the pre-polarizing beam splitter 15R, 15G, 15B is also formed of the substrate made of the transparent material with the absolute value of photoelastic constant being no more than $1.5\times10^{-8}$ cm$^2$/N for the predetermined wavelengths of the incident light into the beam splitter. This also enables the pre-polarizing beam splitters 15R, 15G, 15B to secure sufficiently optically stable performance as compared with the conventional splitters against an increase of stress due to a temperature change and to further restrict the image quality degradation of projection image. However, because the pre-polarizing beam splitters 15R, 15G, 15B only help the function of the principal polarizing beam splitters as polarizers, influence on the image quality degradation of projection image is less than that of the principal polarizing beam splitters 14R, 14G, 14B used as the both of polarizer and analyzer. This allows the polarizing beam splitters formed using the substrate material of BK7 or the like to be employed as the pre-polarizing beam splitters 15R, 15G, 15B. In this invention, the pre-polarizing beam splitters 15R, 15G, 15B are not essential and thus, they may be omitted.

Since the back focus (the distance from the lens rear end to the image plane) of the projection lens 18 is relatively long in this embodiment, the projection lens 18 becomes a little expensive, but operability is improved because the images of the respective color light beams R, G, B are preliminarily combined with each other.

Embodiment 2

Figure 19:
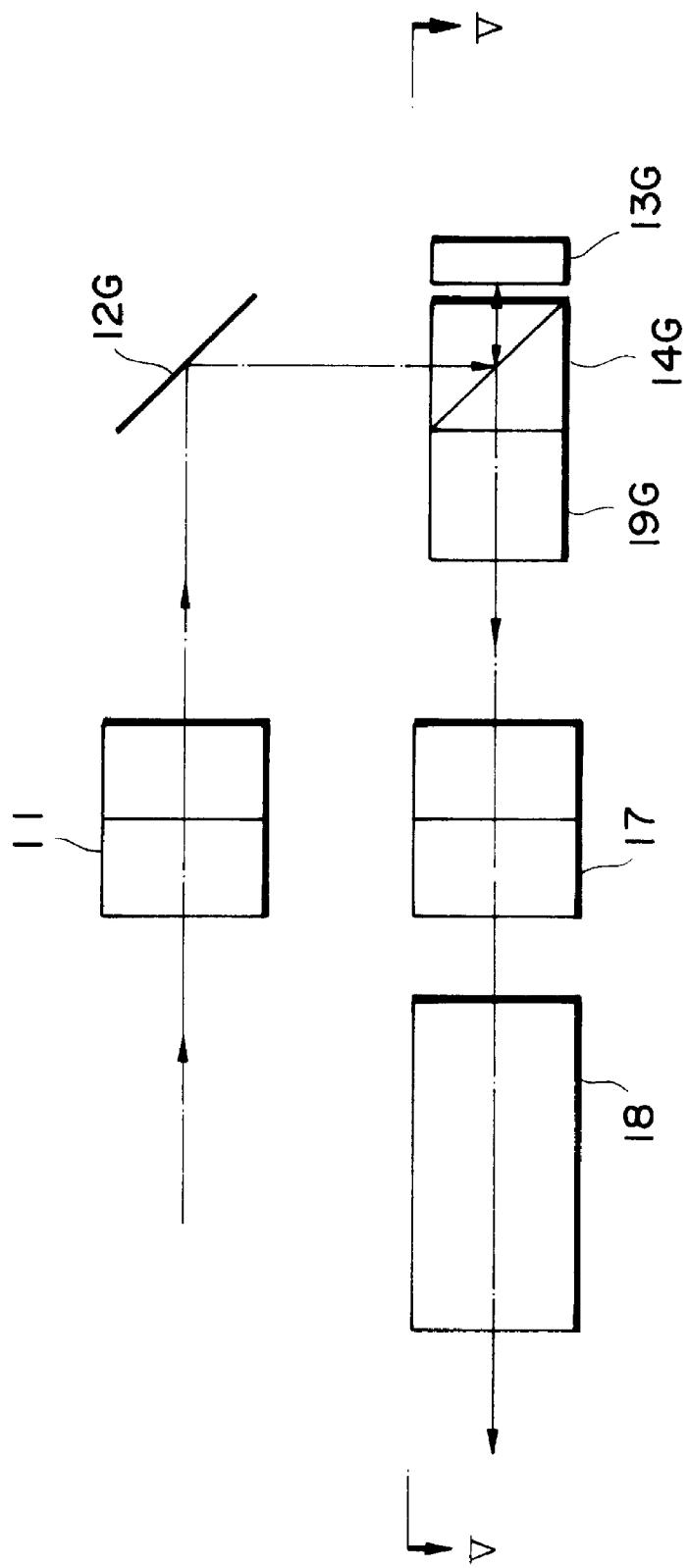
FIG. 19 is a drawing to show the configuration of the second embodiment of the projection type display apparatus according to the present invention.
Figure 20:
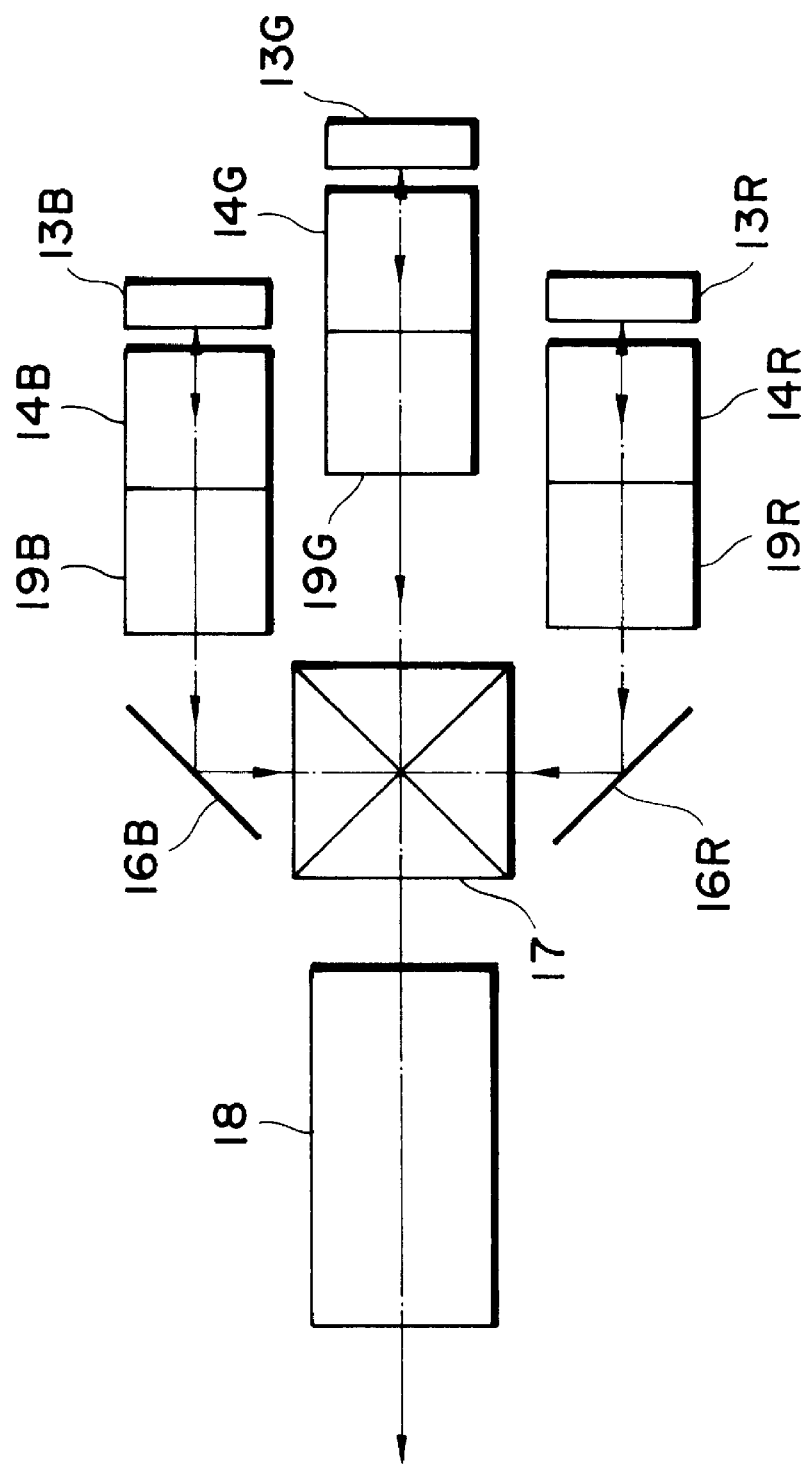
FIG. 20 is a drawing to show the configuration of the second embodiment of the above projection type display apparatus, taken along the line V—V in FIG. 19.

The second embodiment of the projection type display apparatus according to the present invention is next explained referring to FIG. 19 and FIG. 20. FIG. 19 is a drawing to show the configuration of the second embodiment, which is a view observed along the arrows, corresponding to above FIG. 3. FIG. 20 is a drawing to show the configuration of the second embodiment, which is a view taken along the line V—V and observed along the arrows in FIG. 19, corresponding to FIG. 4.

The second embodiment of the projection type display apparatus has the configuration basically similar to that of the projection type display apparatus of the first embodiment as described above. Accordingly, in FIG. 19 and FIG. 20, same or corresponding components will be denoted by the same reference symbols as those shown in FIG. 2 to FIG. 4, and description thereof is omitted.

The second embodiment is different from the first embodiment in that the second embodiment excludes the pre-polarizing beam splitters 15R, 15G, 15B in the first embodiment and instead thereof, post-polarizing beam splitters 19R, 19G, 19B are added in order to raise the purity of polarization of the color light beams R, G, B analyzed by the principal polarizing beam splitters 14R, 14G, 14B and thereafter projected by the projection lens 18. The post-polarizing beam splitters 19R, 19G, 19B are disposed each on the side of the projection lens 18 with respect to the principal polarizing beam splitters 14R, 14G, 14B.

In this embodiment, the post-polarizing beam splitters 19R, 19G, 19B are comprised of the optical glass substrates each made of the transparent material with the absolute value of the photoelastic constant being no more than $1.5\times10^{-8}$ cm$^2$/N for the wavelengths (0.4 $\mu$m to 0.7 $\mu$m) of the incident light into the polarizing beam splitter, similarly as the principal polarizing beam splitters 14R, 14G, 14B are.

Since this embodiment has the post-polarizing beam splitters 19R, 19G, 19B, they can cut the s-polarized light component leaking out of the principal polarizing beam splitters 14R, 14G, 14B, which enhances the purity of polarization (p-polarized light components) of the color light beams R, G, B analyzed by the principal polarizing beam splitters 14R, 14G, 14B and thereafter projected by the projection lens 18 and which improves the contrast of projection image obtained.

Further, the post-polarizing beam splitter 19R, 19G, 19B is formed using the substrates made of the transparent material with the absolute value of the photoelastic constant being no more than $1.5 \times 10^{-8}$ cm$^2$/N for the predetermined wavelengths of the incident light into the associated beam splitter. Accordingly, the post-polarizing beam splitters 19R, 19G, 19B can secure sufficiently optically stable performance as compared with the conventional splitters against the increase of stress due to the temperature change and can further decrease the image quality degradation of projection image. However, because the post-polarizing beam splitters 19R, 19G, 19B only help the function of the principal polarizing beam splitters as analyzers, their influence on the image quality degradation of projection image is less than that of the principal polarizing beam splitters 14R, 14G, 14B used as the both of polarizer and analyzer. This allows the polarizing beam splitters formed using the substrate material of BK7 described above or the like to be employed as the post-polarizing beam splitters 19R, 19G, 19B.

Embodiment 3

Figure 21:
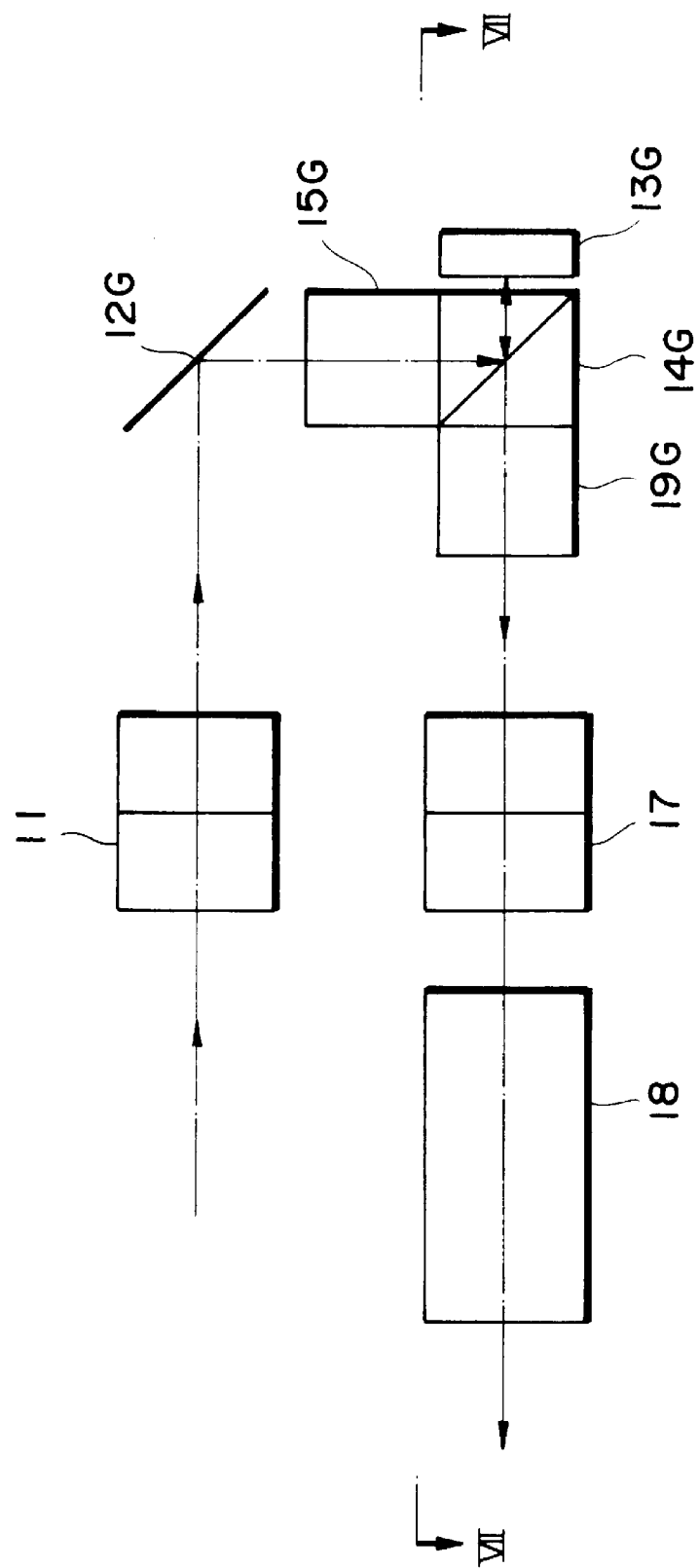
FIG. 21 is a drawing to show the configuration of the third embodiment of the projection type display apparatus according to the present invention.
Figure 22:
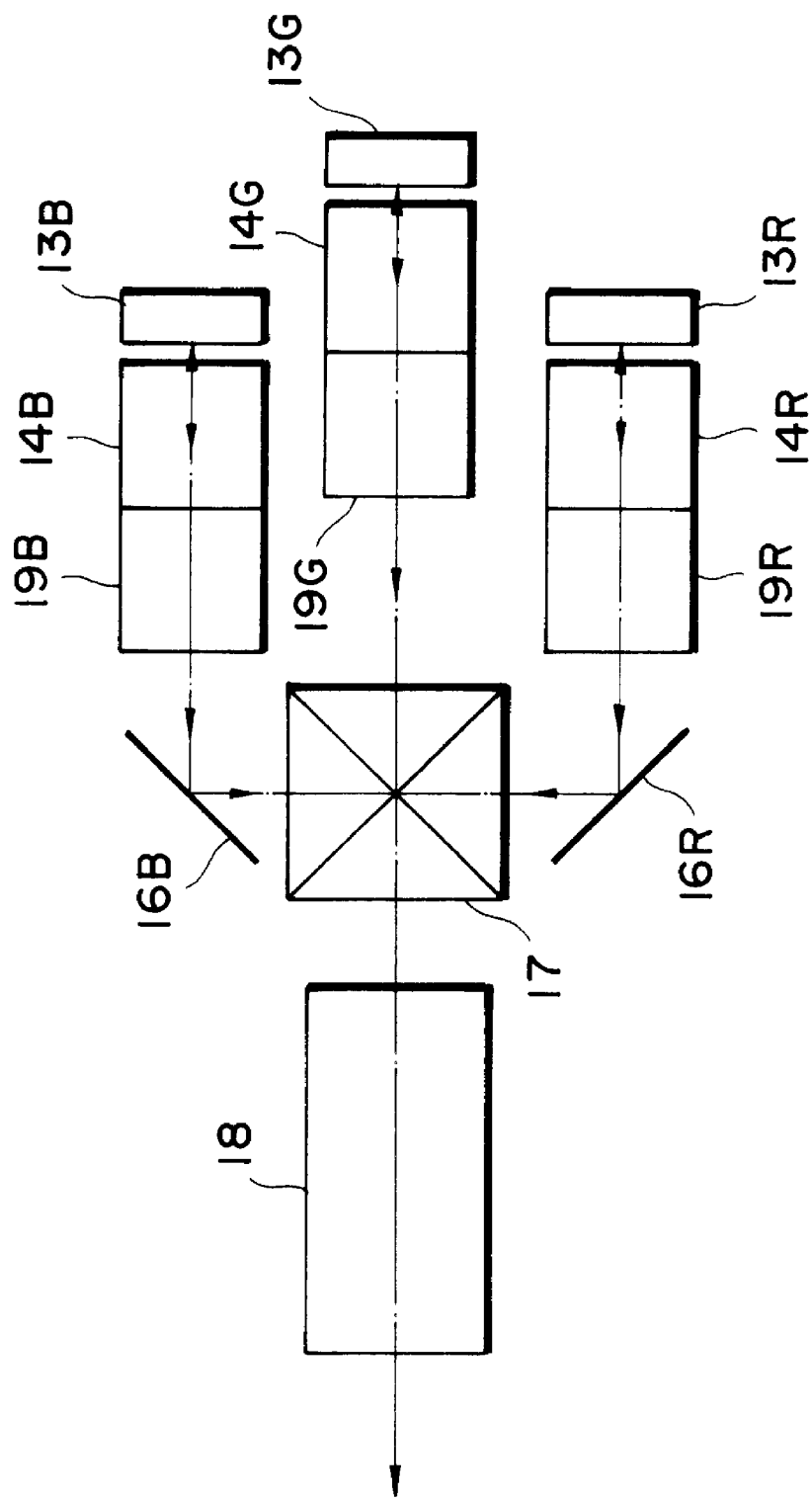
FIG. 22 is a drawing to show the configuration of the third embodiment of the above projection type display apparatus, taken along the line VII—VII in FIG. 21.

The third embodiment of the projection type display apparatus according to the present invention is next explained referring to FIG. 21 and FIG. 22. FIG. 21 is a drawing to show the configuration of the third embodiment, which is a view corresponding to FIG. 3 and FIG. 19. FIG. 22 is a view, taken along the line VII—VII and observed along the arrows in FIG. 21, to show the configuration of the third embodiment, which is a view corresponding to FIG. 4 and FIG. 20.

The third embodiment of the projection type display apparatus basically has the configuration similar to those of the first and second embodiments as described above. Accordingly, in FIG. 21 and FIG. 22, same or corresponding components will be denoted by the same reference symbols as those shown in FIG. 2 to FIG. 4, and FIG. 19 and FIG. 20 as described above, and description thereof is omitted.

The third embodiment is different from the first embodiment in that without removing the pre-polarizing beam splitters 15R, 15G, 15B, the post-polarizing beam splitters 19R, 19G, 19B are added in order to raise the purity of polarization of the color light beams R, G, B analyzed by the principal polarizing beam splitters 14R, 14G, 14B and thereafter projected by the projection lens 18, similarly as in the above second embodiment. The post-polarizing beam splitters 19R, 19G, 19B are disposed on the side of the projection lens 18 with respect to the principal polarizing beam splitters 14R, 14G, 14B.

In the present embodiment, the post-polarizing beam splitter 19R, 19G, 19B is also formed using the optical glass substrates each made of the transparent material with the absolute value of the photoelastic constant being no more than $1.5 \times 10^{-8}$ cm$^2$/N for the wavelengths (0.4 $\mu$m to 0.7 $\mu$m) of the incident light into the polarizing beam splitter, similarly as the principal polarizing beam splitters 14R, 14G, 14B are.

In this embodiment the pre-polarizing beam splitters 15R, 15G, 15B and post-polarizing beam splitters 19R, 19G, 19B help both the function as polarizer and the function as analyzer of the principal polarizing beam splitters 14R, 14G, 14B, which can further improve the contrast of projection image obtained.

Further, the pre-polarizing beam splitters 15R, 15G, 15B and the post-polarizing beam splitters 19R, 19G, 19B are formed using the substrates each made of the transparent material with the absolute value of the photoelastic constant being no more than $1.5 \times 10^{-8}$ cm$^2$/N for the predetermined wavelengths of the incident light into the beam splitter. Thus, these polarizing beam splitters 15R, 15G, 15B, 19R, 19G, 19B can secure sufficiently optically stable performance as compared with the conventional splitters against the increase of stress due to the temperature change and can further decrease the image quality degradation of projection image. However, the polarizing beam splitters formed using the substrate material of BK7 or the like as described above may be employed as these polarizing beam splitters 15R, 15G, 15B, 19R, 19G, 19B.

Embodiment 4

Figure 23:
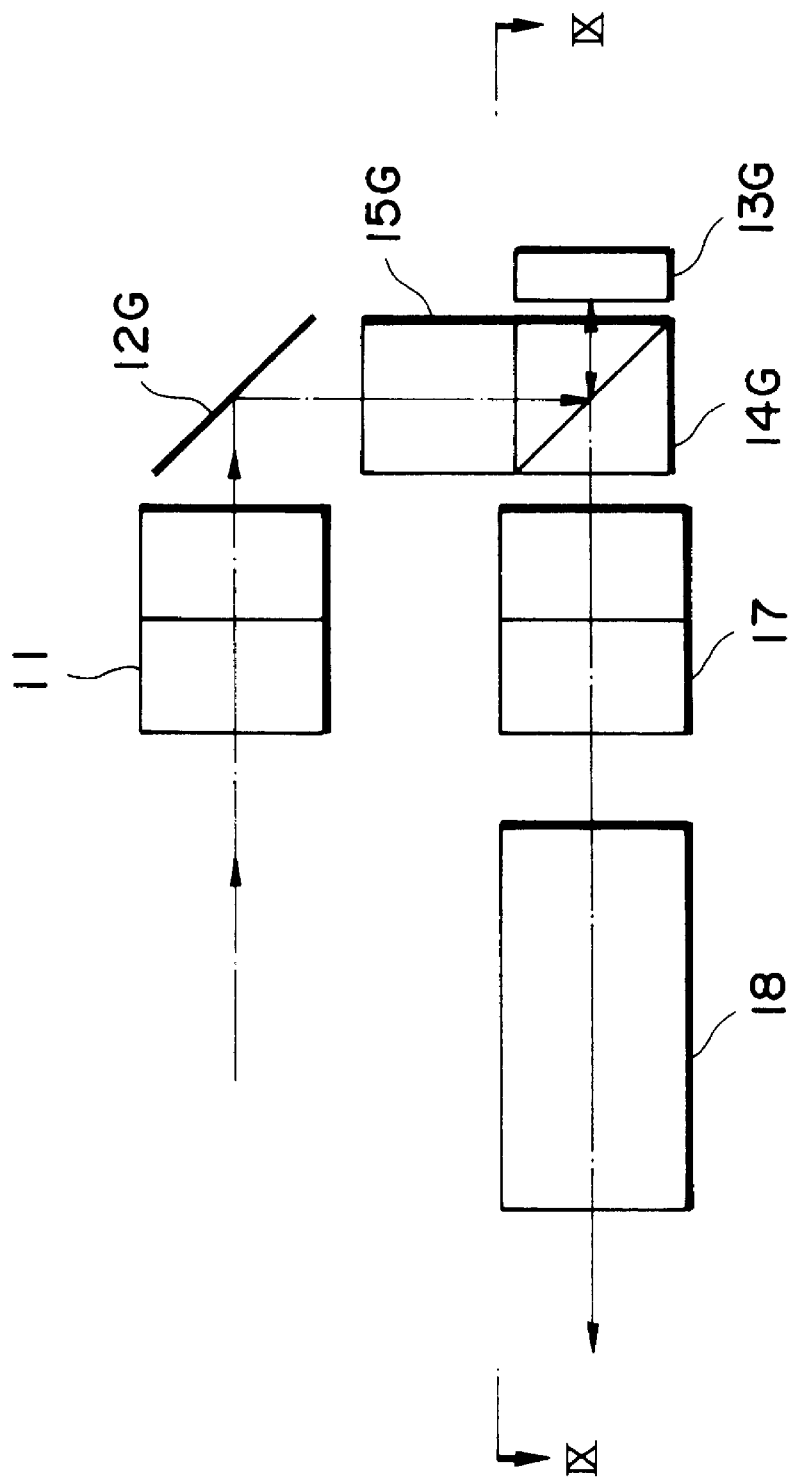
FIG. 23 is a drawing to show the configuration of the fourth embodiment of the projection type display apparatus according to the present invention.
Figure 24:
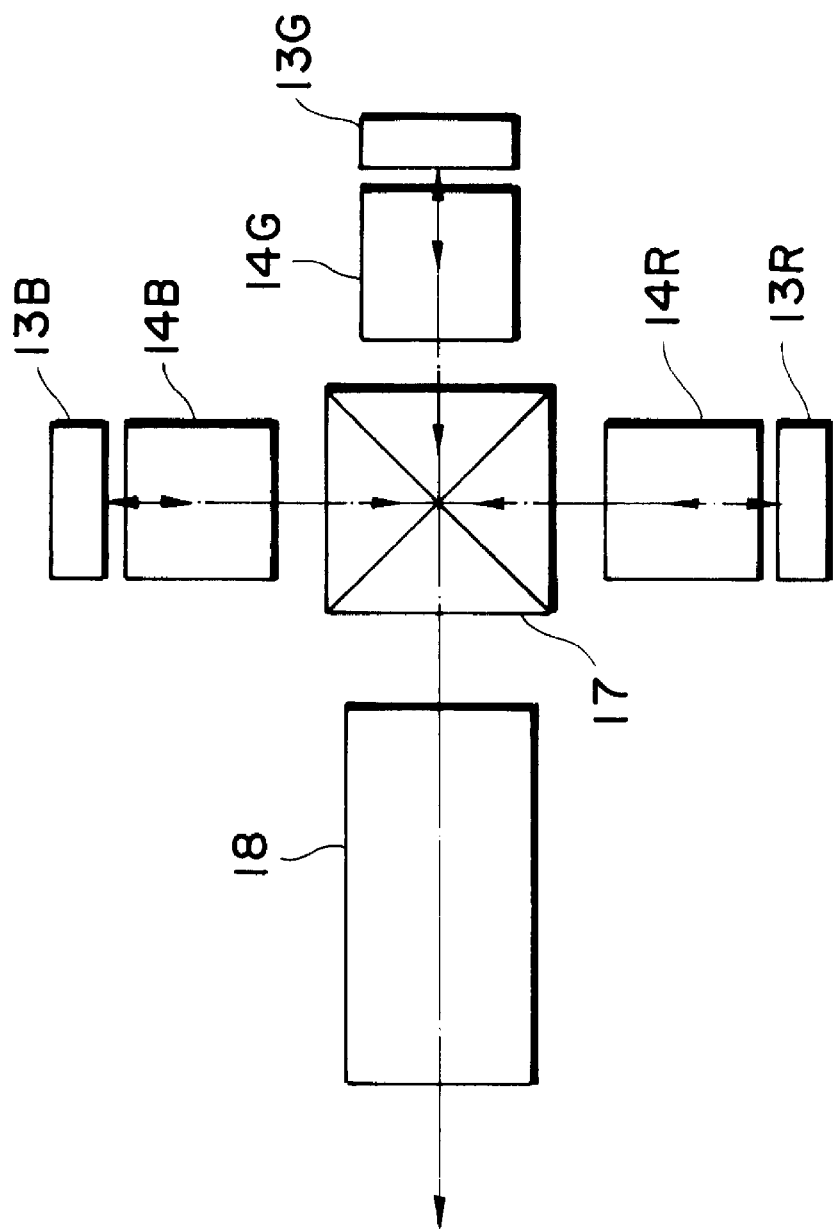
FIG. 24 is a drawing to show the configuration of the fourth embodiment of the above projection type display apparatus, taken along the line IX—IX in FIG. 23.

The fourth embodiment of the projection type display apparatus according to the present invention is next explained referring to FIG. 23 and FIG. 24. FIG. 23 is a drawing to show the configuration of the fourth embodiment, which is a view corresponding to FIG. 3. FIG. 24 is a view, taken along the line IX—IX and observed along the arrows in FIG. 23, to show the configuration of the fourth embodiment, which is a view corresponding to FIG. 4.

The fourth embodiment of the projection type display apparatus has the configuration basically similar to that of the first embodiment as described previously. Accordingly, in FIG. 23 and FIG. 24, same or corresponding components are denoted by the same reference symbols as those shown in FIG. 2 to FIG. 4, and description thereof is omitted.

The fourth embodiment is different from the first embodiment in that the mirrors 16R, 16B are removed and the set of the spatial light modulator 13R, principal polarizing beam splitter 14R, and pre-polarizing beam splitter 15R and the set of the spatial light modulator 13B, principal polarizing beam splitter 14B, and pre-polarizing beam splitter 15B change their orientations so as to be disposed beside the cross dichroic mirror 11 and cross dichroic prism 17. The fourth embodiment is substantially the same as the first embodiment.

Embodiment 5

Figure 25:
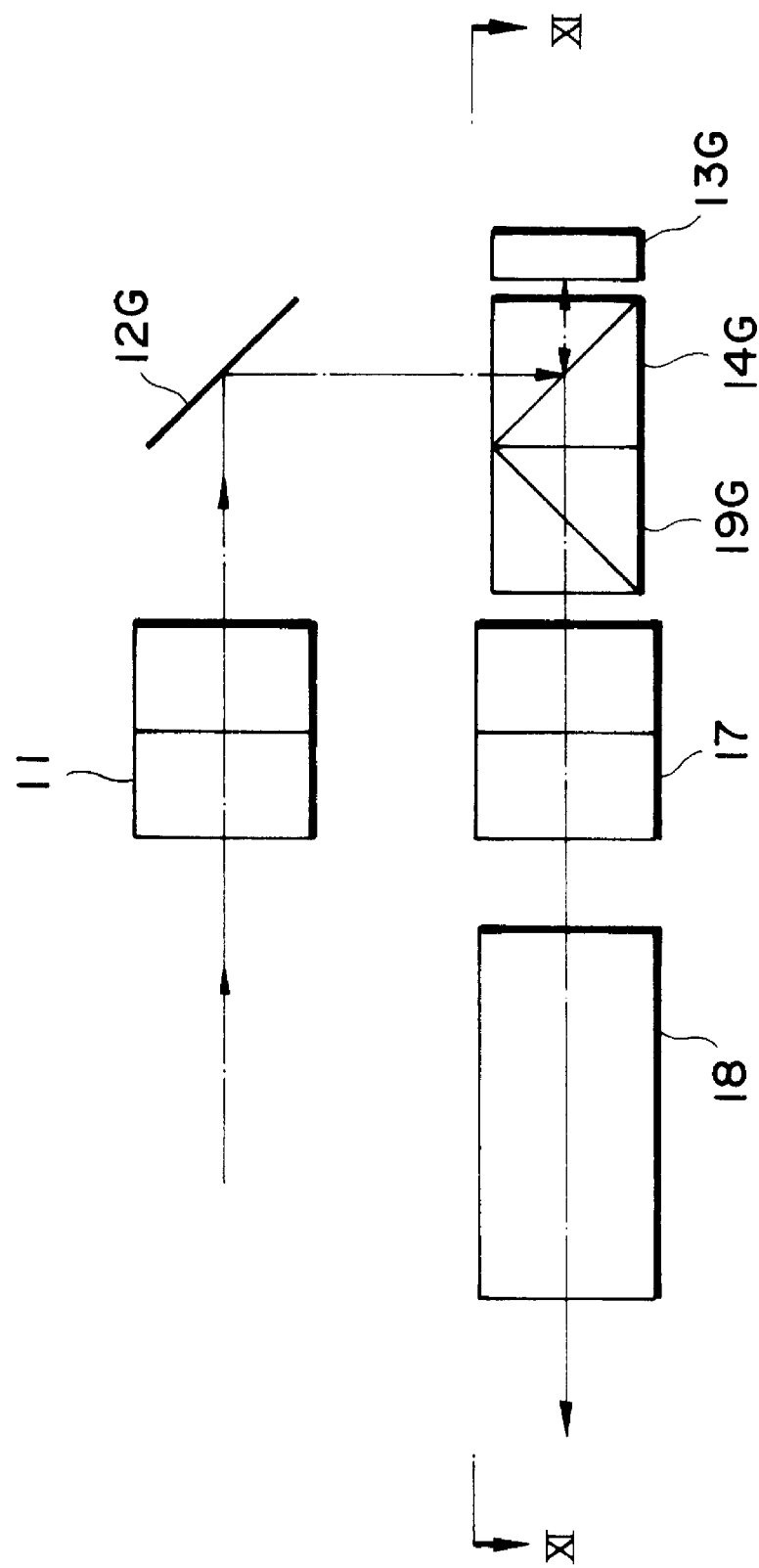
FIG. 25 is a drawing to show the configuration of the fifth embodiment of the projection type display apparatus according to the present invention.
Figure 26:
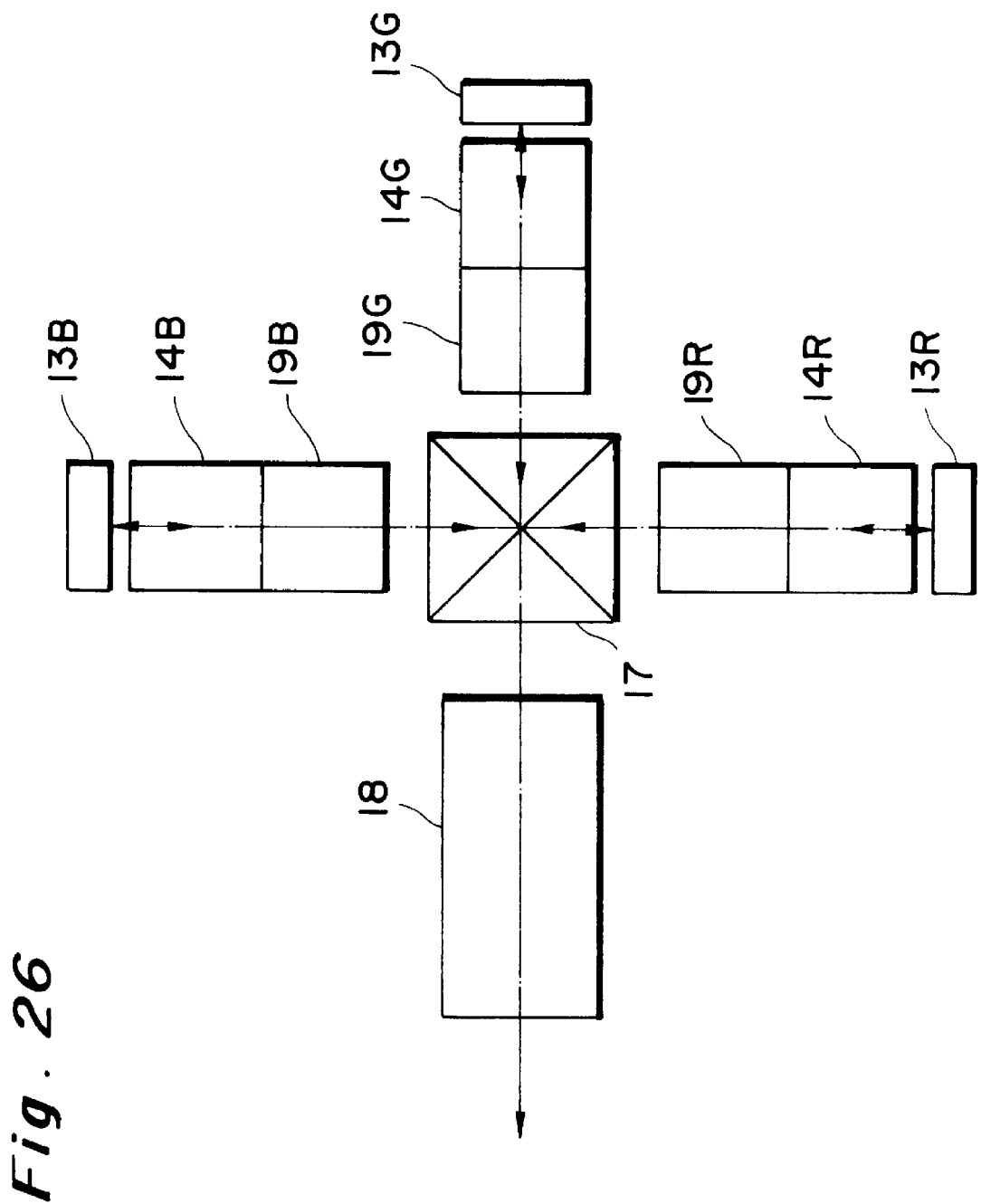
FIG. 26 is a drawing to show the configuration of the fifth embodiment of the above projection type display apparatus, taken along the line XI—XI in FIG. 25.

The fifth embodiment of the projection type display apparatus according to the present invention is next explained referring to FIG. 25 and FIG. 26. FIG. 25 is a drawing to show the configuration of the fifth embodiment, which is a view corresponding to FIG. 19. FIG. 26 is a view, taken along the line XI—XI and observed along the arrows in FIG. 25, to show the configuration of the fifth embodiment, which is a view corresponding to FIG. 20.

The fifth embodiment of the projection type display apparatus has the configuration basically similar to that of the second embodiment as described above. Accordingly, in FIG. 25 and FIG. 26, same or corresponding components are denoted by the same reference symbols as those shown in FIG. 19 and FIG. 20, and description thereof is omitted.

The fifth embodiment is different from the second embodiment in that the mirrors 16R, 16B are removed and the set of the spatial light modulator 13R, principal polarizing beam splitter 14R, and post-polarizing beam splitter 19R and the set of the spatial light modulator 13B, principal polarizing beam splitter 14B, and post-polarizing beam splitter 19B change their orientations so as to be disposed beside the cross dichroic mirror 11 and cross dichroic prism 17. The fifth embodiment is substantially the same as the second embodiment.

Embodiment 6

Figure 27:
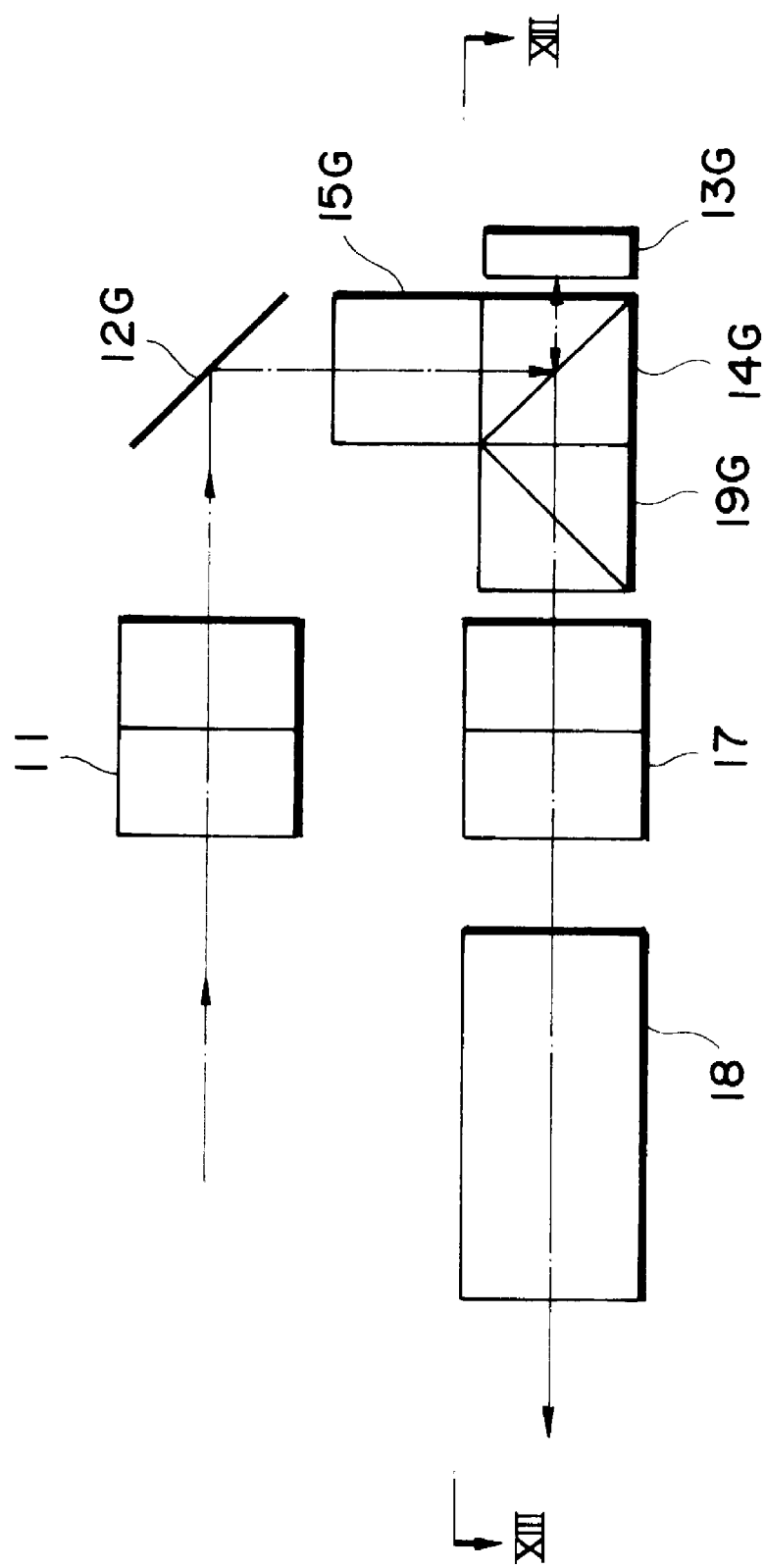
FIG. 27 is a drawing to show the configuration of the sixth embodiment of the projection type display apparatus according to the present invention.
Figure 28:
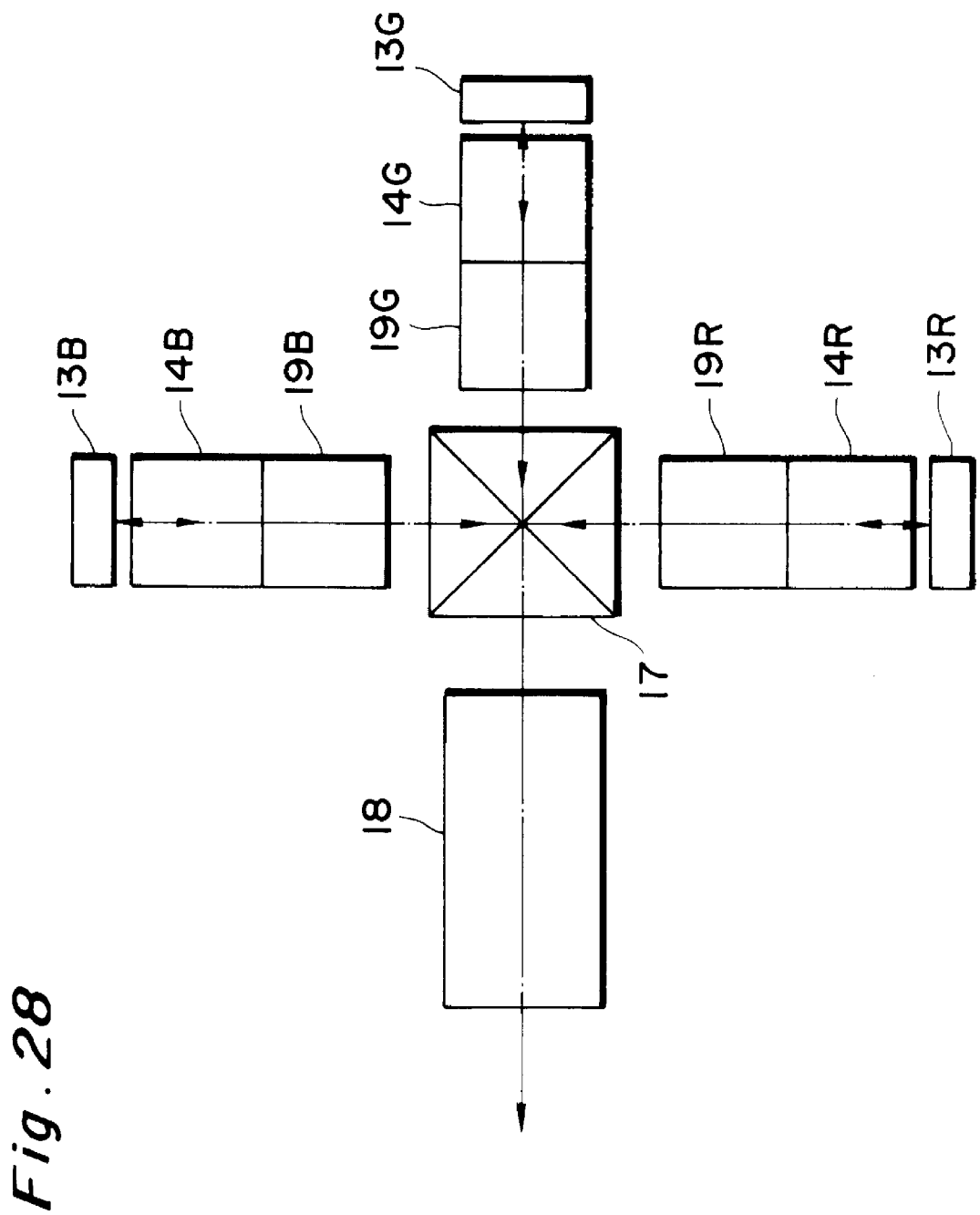
FIG. 28 is a drawing to show the configuration of the sixth embodiment of the above projection type display apparatus, taken along the line XIII—XIII in FIG. 27.

The sixth embodiment of the projection type display apparatus according to the present invention is next explained referring to FIG. 27 and FIG. 28. FIG. 27 is a drawing to show the configuration of the sixth embodiment, which is a view corresponding to FIG. 21. FIG. 28 is a view taken along the line XIII—XIII and observed along the arrows in FIG. 27, to show the configuration of the sixth embodiment, which is a view corresponding to FIG. 22.

The sixth embodiment of the projection type display apparatus has the configuration basically similar to that of the third embodiment as described above. Accordingly, in FIG. 27 and FIG. 28, same or corresponding components are denoted by the same reference symbols as those shown in FIG. 21 and FIG. 22, and description thereof is omitted.

The sixth embodiment is different from the third embodiment in that the mirrors 16R, 16B are removed and the set of the spatial light modulator 13R, principal polarizing beam splitter 14R, pre-polarizing beam splitter 15R, and post-polarizing beam splitter 19R and the set of the spatial light modulator 13B, principal polarizing beam splitter 14B, pre-polarizing beam splitter 15B, and post-polarizing beam splitter 19B change their orientations so as to be disposed beside the cross dichroic mirror 11 and cross dichroic prism 17. The sixth embodiment is substantially the same as the third embodiment.

Embodiment 7

Figure 29:
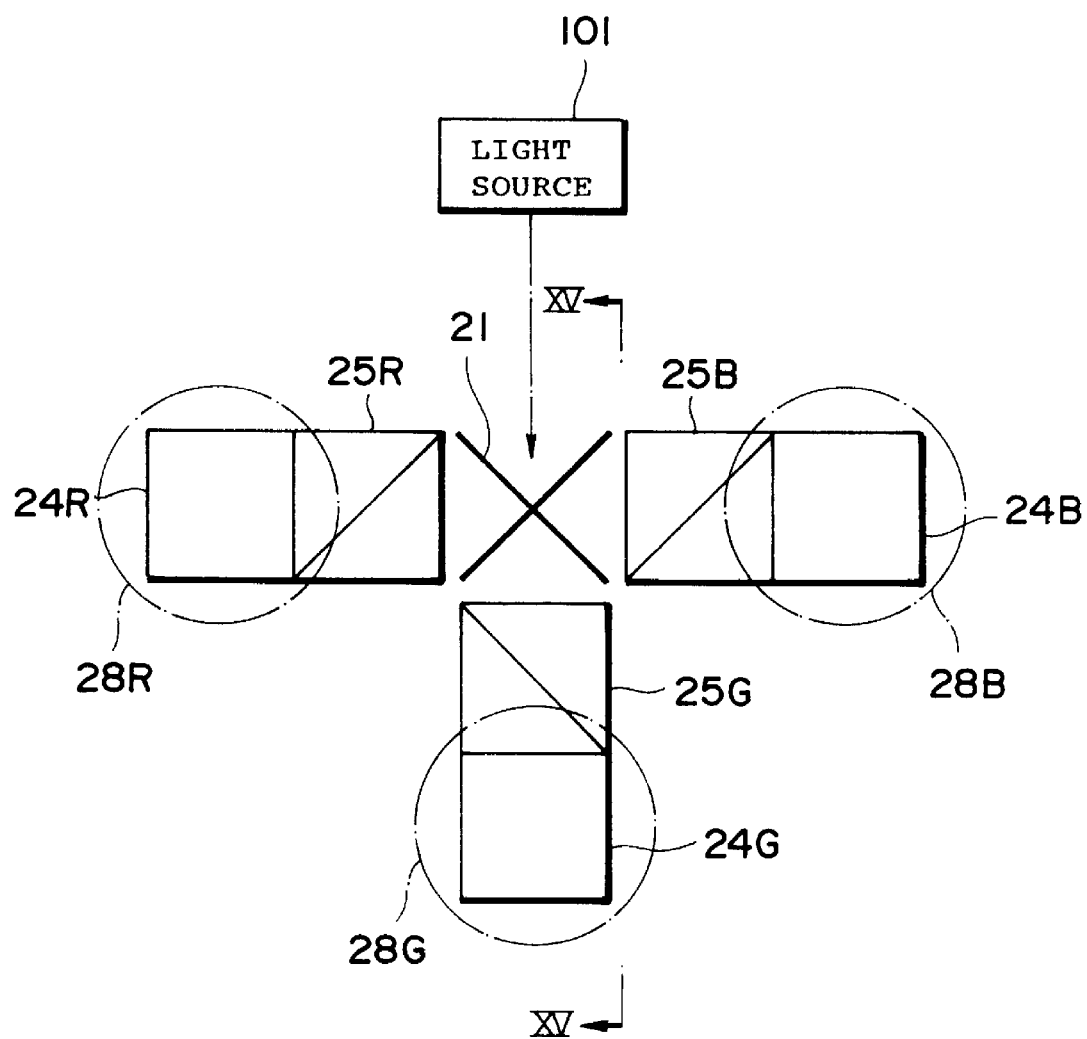
FIG. 29 is a drawing to show the configuration of the seventh embodiment of the projection type display apparatus according to the present invention.
Figure 30:
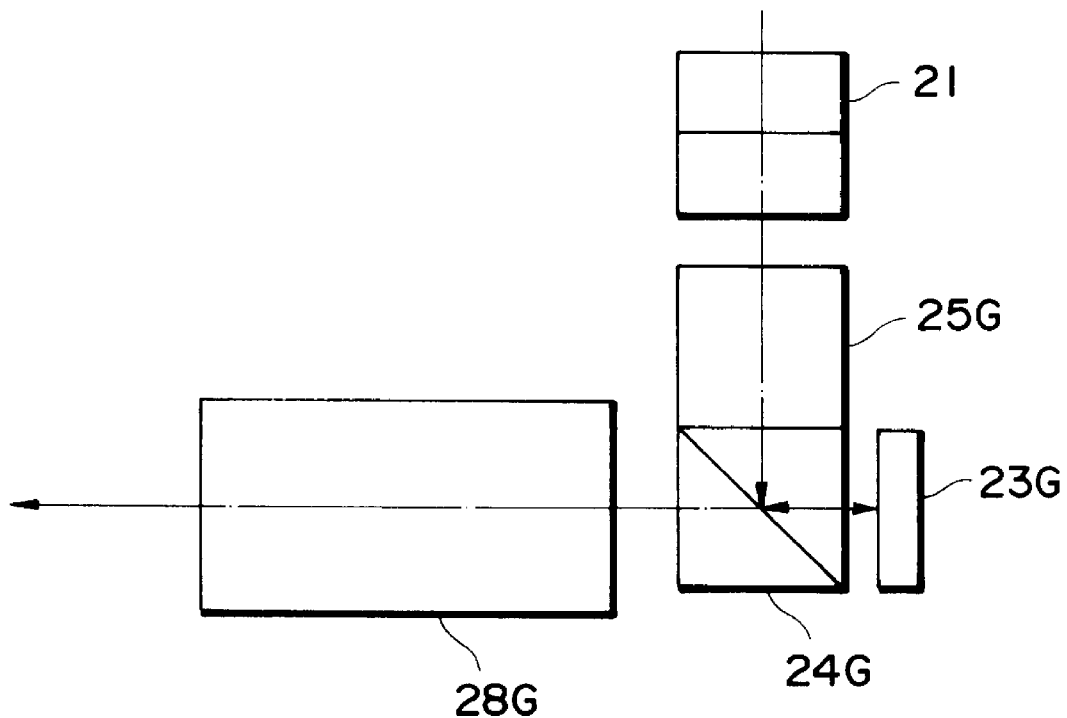
FIG. 30 is a drawing to show the configuration of the seventh embodiment of the above projection type display apparatus, taken along the line XV—XV in FIG. 29.

The seventh embodiment of the projection type display apparatus according to the present invention is next explained referring to FIG. 29 and FIG. 30. FIG. 29 is a drawing to show the configuration of the seventh embodiment, and FIG. 30 is a view, taken along the line XV—XV and observed along the arrows in FIG. 29, to show the configuration of the seventh embodiment.

The first to sixth embodiments as described above were examples of the projection type display apparatus of a single projection lens type in which the color light beams R, G, B are preliminarily combined by the color combining means and an image is projected through a single projection lens onto the predetermined surface such as a screen. In contrast, the seventh embodiment is an example of the projection type display apparatus of a three-projection-lens type in which the color light beams R, G, B are projected without being preliminarily combined, through three respective projection lenses onto the screen and color combination is effected on the screen.

The seventh embodiment of the projection type display apparatus has the cross dichroic mirror 21 as a color separating means for separating the light from the light source 101 into color light beams of red (R), green (G), and blue (B); the spatial light modulators 23R, 23G, 23B (among which the spatial light modulators 23R, 23B are not illustrated in the drawings, but are located on that side of the plane of FIG. 29 with respect to the principal beam splitters 24R, 24B in FIG. 29) such as phase difference modulation type liquid crystal light valves, corresponding to the respective color light beams R, G, B; the principal polarizing beam splitters 24R, 24G, 24B for polarizing the incident light of the respective color light beams R, G, B to emit the light to the spatial light modulators 23R, 23G, 23B and analyzing reflected light from the spatial light modulators 23R, 23G, 23B; the pre-polarizing beam splitters 25R, 25G, 25B disposed on the side of incidence of the incident light with respect to the principal polarizing beam splitters 24R, 24G, 24B, each for raising the purity of polarization of the light projected to the spatial light modulator 23R, 23G, 23B; and three projection lenses 28R, 28G, 28B for projecting the light analyzed by the respective principal polarizing beam splitters 24R, 24G, 24B to the screen or the like.

Also in this embodiment, similarly as in the first embodiment, the principal polarizing beam splitters 24R, 24G, 24B and the pre-polarizing beam splitters 25R, 25G, 25B are formed using the optical glass substrates each made of the transparent material with the absolute value of photoelastic constant thereof being no more than $1.5 \times 10^{-8}$ cm$^2$/N for the wavelengths (0.4 µm to 0.7 µm) of the incident light into the polarizing beam splitter. This embodiment can also achieve the same advantages as the first embodiment has.

Since the present embodiment employs the arrangement of the three projection lens type, adjustment is necessary for each of the projection lenses 28R, 28G, 28B. However, because the back focus (the distance from the lens rear end to the image plane) of the projection lens 28R, 28G, 28B can be short, compact and cheap projection lenses easy in design can be used as these projection lenses 28R, 28G, 28B. Accordingly, the present embodiment permits the entire apparatus to be further more compact and cheaper than the first to sixth embodiments as described above.

Embodiment 8

Figure 31:
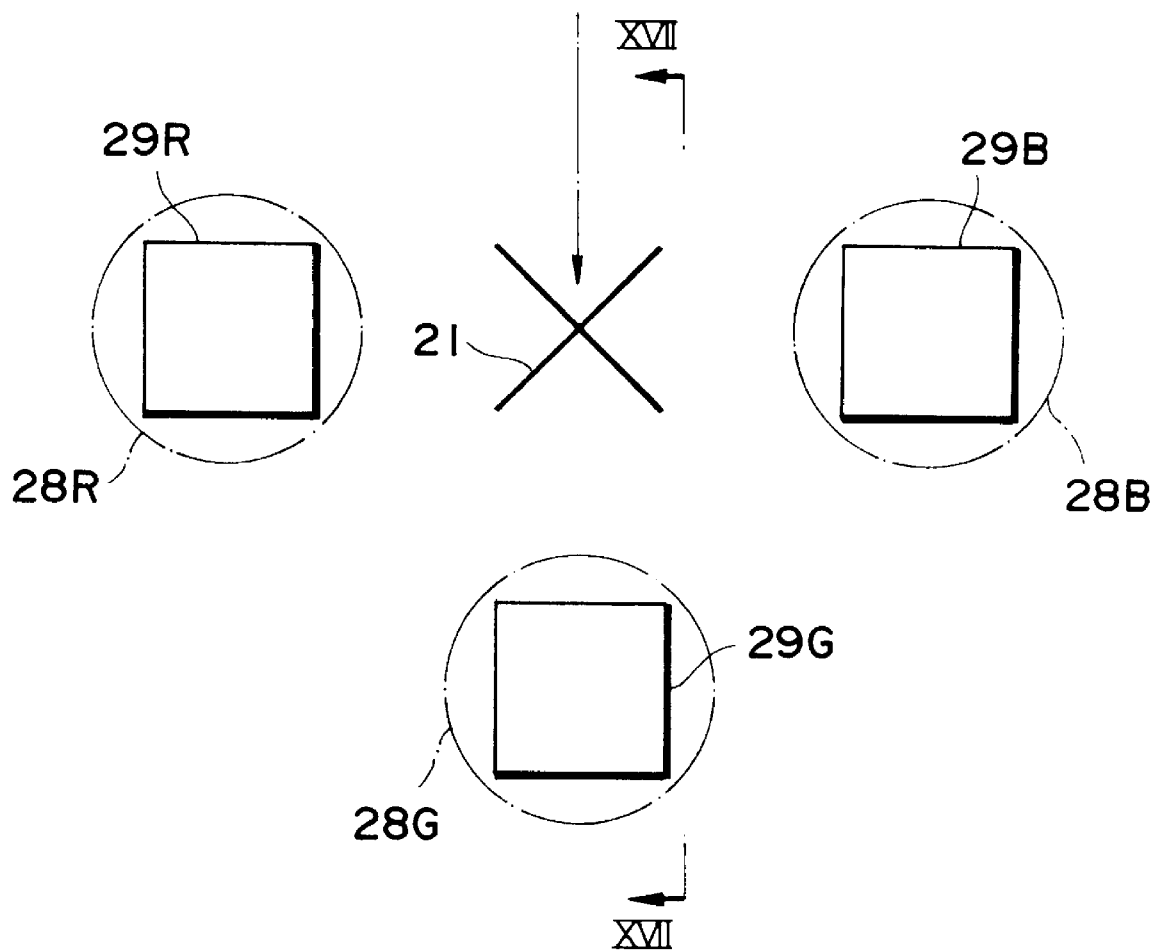
FIG. 31 is a drawing to show the configuration of the eighth embodiment of the projection type display apparatus according to the present invention.
Figure 32:
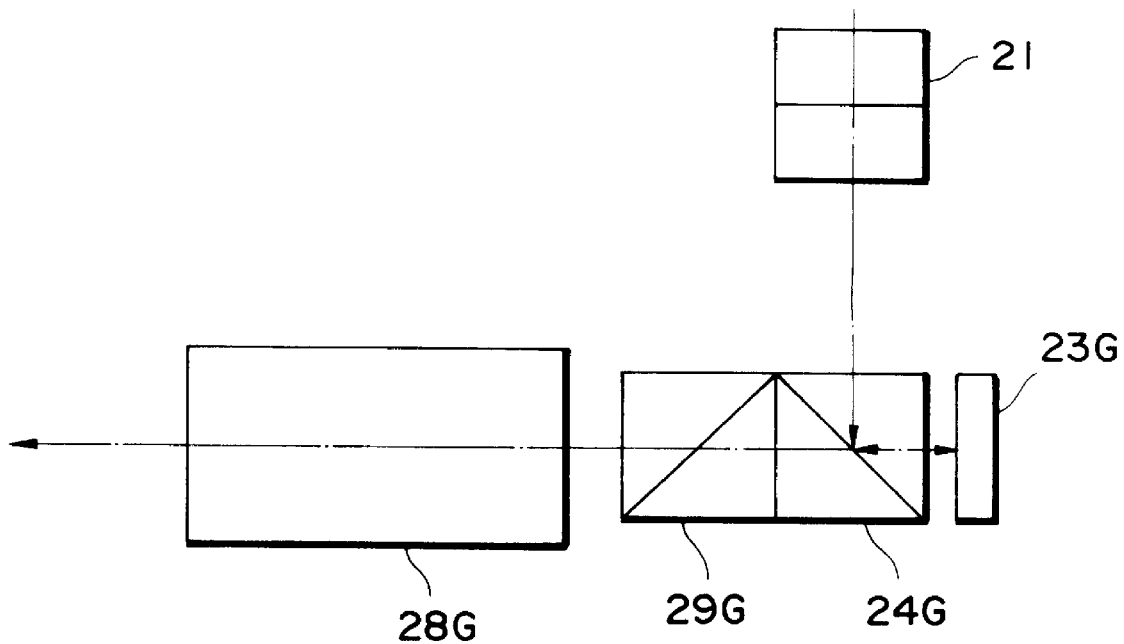
FIG. 32 is a drawing to show the configuration of the eighth embodiment of the above projection type display apparatus, taken along the line XVII—XVII in FIG. 31.

The eighth embodiment of the projection type display apparatus according to the present invention is next explained referring to FIG. 31 and FIG. 32. FIG. 31 is a drawing to show the configuration of the eighth embodiment, which is a view corresponding to FIG. 29. FIG. 32 is a view, taken along the line XVII—XVII and observed along the arrows in FIG. 31, to show the configuration of the eighth embodiment, which is a view corresponding to FIG. 30.

The eighth embodiment of the projection type display apparatus has the configuration basically similar to that of the seventh embodiment as described above. Accordingly, in FIG. 31 and FIG. 32, same or corresponding components are denoted by the same reference symbols as those shown in FIG. 29 and FIG. 30 as described above, and description thereof is omitted.

The eighth embodiment is different from the seventh embodiment in that the eighth embodiment excludes the pre-polarizing beam splitters 25R, 25G, 25B in the seventh embodiment and instead thereof, the post-polarizing beam splitters 29R, 29G, 29B are added in order to raise the purity of polarization of the color light beams R, G, B analyzed by the principal polarizing beam splitters 24R, 24G, 24B and thereafter projected by the projection lenses 28R, 28G, 28B. The post-polarizing beam splitters 29R, 29G, 29B are disposed on the side of the projection lenses 28R, 28G, 28B with respect to the principal polarizing beam splitters 24R, 24G, 24B.

In this embodiment, the post-polarizing beam splitter 29R, 29G, 29B is also formed using the optical glass substrates each made of the transparent material with the absolute value of the photoelastic constant being no more than $1.5 \times 10^{-8}$ cm$^2$/N for the wavelengths (0.4 µm to 0.7 µm) of the incident light into the polarizing beam splitter, similarly as the principal polarizing beam splitters 24R, 24G, 24B are. This embodiment can achieve the same advantages as the second embodiment.

Embodiment 9

Figure 33:
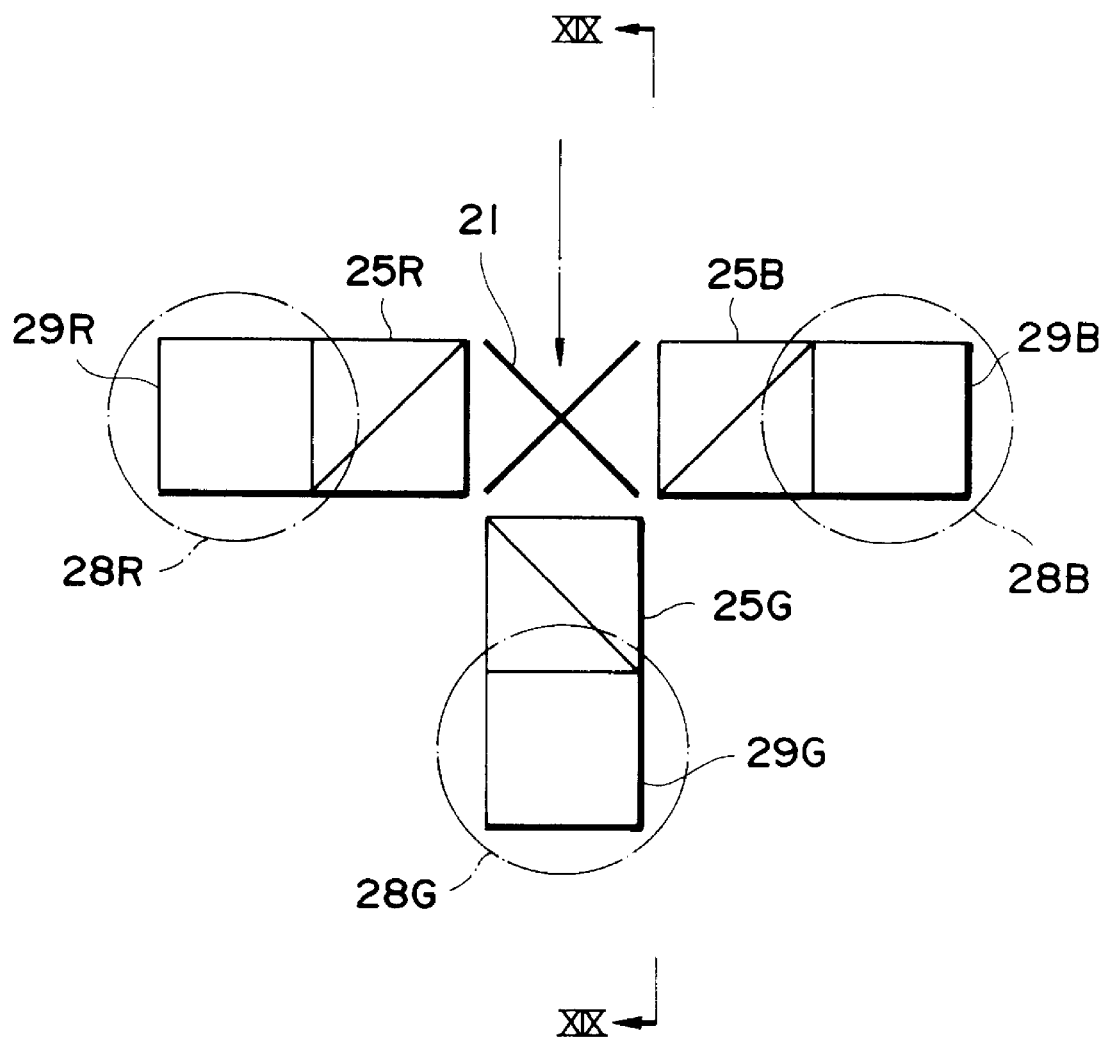
FIG. 33 is a drawing to show the configuration of the ninth embodiment of the projection type display apparatus according to the present invention.
Figure 34:
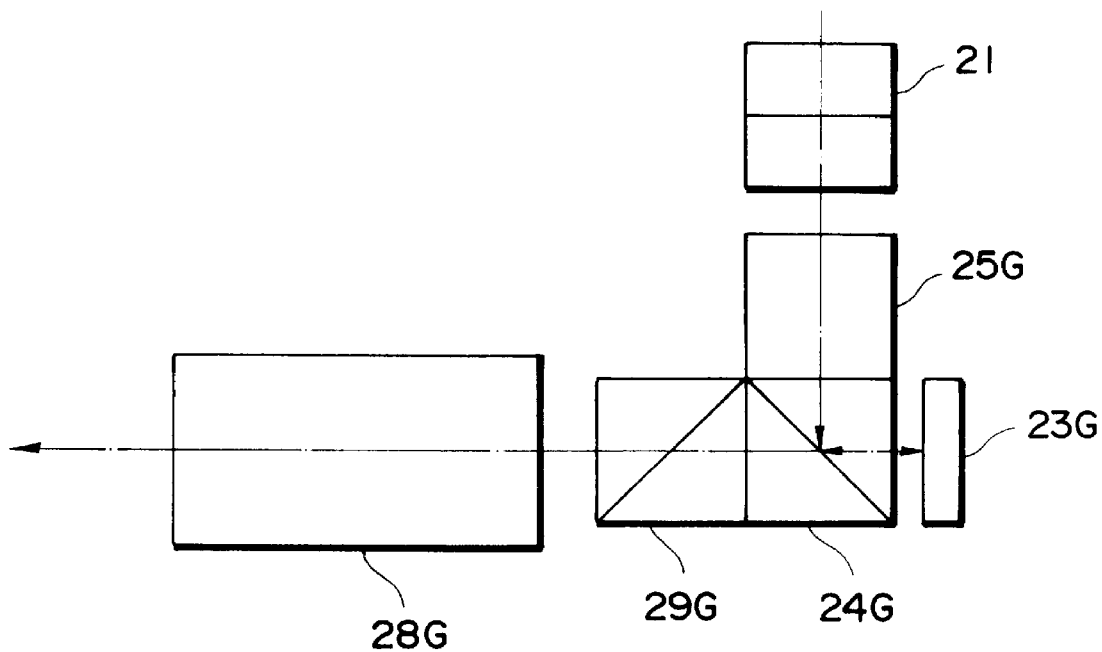
FIG. 34 is a drawing to show the configuration of the ninth embodiment of the above projection type display apparatus, taken along the line XIX—XIX in FIG. 33.

The ninth embodiment of the projection type display apparatus according to the present invention is next explained referring to FIG. 33 and FIG. 34. FIG. 33 is a drawing to show the configuration of the ninth embodiment, which is a view corresponding to FIGS. 29 and 31. FIG. 34 is a view taken along the line XIX—XIX and observed along the arrows in FIG. 33, to show the configuration of the ninth embodiment, which is a view corresponding to FIG. 30 and FIG. 32.

The ninth embodiment of the projection type display apparatus has the configuration basically similar to those of the seventh and eighth embodiments as described above. Accordingly, in FIG. 33 and FIG. 34, same or corresponding components are denoted by the same reference symbols as those shown in FIG. 29 to FIG. 32 as described above, and description thereof is omitted.

The ninth embodiment is different from the seventh embodiment in that without removing the pre-polarizing beam splitters 25R, 25G, 25B, the post-polarizing beam splitters 29R, 29G, 29B are added in order to raise the purity of polarization of the color light beams R, G, B analyzed by the principal polarizing beam splitters 24R, 24G, 24B and thereafter projected by the projection lenses 28R, 28G, 28B, similarly as in the above eighth embodiment. The post-polarizing beam splitters 29R, 29G, 29B are disposed each on the side of the projection lenses 28R, 28G, 28B with respect to the principal polarizing beam splitters 24R, 24G, 24B.

In this embodiment, the post-polarizing beam splitter 29R, 29G, 29B is also formed using the optical glass substrates each made of the transparent material with the absolute value of the photoelastic constant being no more than $1.5\times10^{-8}$ cm$^2$/N for the wavelengths (0.4 $\mu$m to 0.7 $\mu$m) of the incident light into the polarizing beam splitter, similarly as the principal polarizing beam splitters 24R, 24G, 24B are. This embodiment can also attain the same advantages as the third embodiment.

As detailed above, because the present invention employs the polarizing beam splitters not using the liquid, it is free of the problems due to the use of the conventional liquid immersion type polarizing beam splitter. Further, the present invention has the advantage of facilitating production of the apparatus itself. Moreover, the invention can provide the projection type display apparatus having the structure that can secure optically stable performance against the influence of the various thermal stress and external stress and that can effectively reduce the image quality degradation of projection image.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 72372/199500 filed on Mar. 6, 1995 and No. 168298/1995 filed on Jun. 9, 1995 are hereby incorporated by reference.

What is claimed is:

1. A projection type display apparatus comprising:
   a spatial light modulator;
   a polarizing beam splitter for polarizing light incident thereto to emit polarized light to said spatial light modulator and analyzing reflected light modulated from said spatial light modulator, said polarizing beam splitter comprising a dielectric multilayer film, and a first transparent material member and a second transparent material member sandwiching the dielectric multilayer film, each of said first and second transparent material members comprising a transparent material with an absolute value of a photoelastic constant being no more than $1.5\times10^{-8}$ cm$^2$/N for light of a predetermined wavelength incident into said beam splitter; and
   a projection optical system for projecting the light analyzed by said polarizing beam splitter onto a predetermined surface.

2. The display apparatus according to claim 1, wherein each of said first and second transparent material members is comprised of a transparent material with a refractive index being at least 1.8 and with an absolute value of a photoelastic constant being no more than $1.5\times10^{-8}$ cm$^2$/N for light of wavelengths 0.4 $\mu$m to 0.7 $\mu$m incident to said polarizing beam splitter.

3. The display apparatus according to claim 2, wherein each of said first and second transparent material members is comprised of a transparent material with an absolute value of a photoelastic constant being no more than $0.1\times10^{-8}$ cm$^2$/N for light of the wavelengths of 0.4 $\mu$m to 0.7 $\mu$m.

4. The display apparatus according to claim 1, wherein said dielectric multilayer film comprises at least a first dielectric multilayer film and a second dielectric multilayer film, each of said first and second dielectric multilayer films having:
   an alternate layer of a lamination of n cycles, where n is an integer, defining a base cycle composed of a first layer made of a high-index substance of an optical thickness $\lambda_1/4$ at a first center wavelength $\lambda_1$ and a second layer made of a low-index substance of an optical thickness $\lambda_2/4$ at a second center wavelength $\lambda_2$ different from the first center wavelength $\lambda_1$; and
   thin-film adjuster layers made of one of said high-index substance of an optical thickness $\lambda_1/8$ and said low-index substance of an optical thickness $\lambda_2/8$, formed on both sides of said alternate layer,
   wherein at least one substance of the first dielectric multilayer film is different from each substance in the second dielectric multilayer film.

5. The display apparatus according to claim 4, wherein the alternate layer of the first dielectric multilayer film comprises a high-index substance $TiO_2$ with a low-index substance $SiO_2$; and
   the alternate layer of the second dielectric multilayer film comprises the high-index substance $TiO_2$ with a low-index substance $Al_2O_3$.

6. The display apparatus according to claim 4, wherein the alternate layer of the first dielectric multilayer film comprises a high-index substance $TiO_2$ with a low-index substance $SiO_2$; and
   the alternate layer of the second dielectric multilayer film comprises a high-index substance $ZrO_2$ with a low-index substance $MgF_2$.

7. The display apparatus according to claim 1, further comprising an auxiliary polarizing beam splitter disposed on an incidence side of said polarizing beam splitter, to which the light to be polarized by said polarizing beam splitter and to be emitted toward said spatial light modulator is incident, for raising a purity of polarization of said light emitted from said polarizing beam splitter to said spatial light modulator,
   wherein said auxiliary polarizing beam splitter comprises a dielectric multilayer film, and a third transparent material member and a fourth transparent material member sandwiching said dielectric multilayer film, and
   wherein each of said third and fourth transparent members comprises a transparent material with an absolute value of a photoelastic constant being no more than $1.5\times10^{-8}$ cm$^2$/N for the light of the predetermined wavelength to said beam splitter.

8. The display apparatus according to claim 7, wherein each of said third and fourth transparent material members is comprised of a transparent material with a refractive index being at least 1.8 and with an absolute value of a photoelastic constant being no more than $1.5\times10^{-8}$ cm$^2$/N for the light of wavelengths 0.4 $\mu$m to 0.7 $\mu$m incident to said polarizing beam splitter.

9. The display apparatus according to claim 8, wherein each of said third and fourth transparent material members is comprised of a transparent material with an absolute value of a photoelastic constant being no more than $0.1 \times 10^{-8}$ cm$^2$/N for the light of wavelengths 0.4 $\mu$m to 0.7 $\mu$m.

10. The display apparatus according to claim 1, further comprising an auxiliary polarizing beam splitter disposed in an optical path between said polarizing beam splitter and said projection optical system, for raising a purity of polarization of the light analyzed by said polarizing beam splitter and thereafter emitted to said projection optical system, wherein said auxiliary polarizing beam splitter comprises a dielectric multilayer film, and a third transparent material member and a fourth transparent material member sandwiching said dielectric multilayer film, and wherein each of said third and fourth transparent material members comprises a transparent material with an absolute value of a photoelastic constant being no more than $1.5 \times 10^{-8}$ cm$^2$/N for the light of the predetermined wavelength incident to said beam splitter.

11. The display apparatus according to claim 10, wherein each of said third and fourth transparent material members is comprised of a transparent material with a refractive index being at least 1.8 and with an absolute value of a photoelastic constant being no more than $1.5 \times 10^{-8}$ cm$^2$/N for light of wavelengths 0.4 $\mu$m to 0.7 $\mu$m incident to said polarizing beam splitter.

12. The display apparatus according to claim 11, wherein each of said third and fourth transparent material members is comprised of a transparent material member with an absolute value of a photoelastic constant being no more than $0.1 \times 10^{-8}$ cm$^2$/N for the light of the wavelengths 0.4 $\mu$m to 0.7 $\mu$m.

\* \* \* \* \*